US012620188B2

(12) United States Patent
Ghosh et al.

(10) Patent No.: US 12,620,188 B2
(45) Date of Patent: May 5, 2026

(54) AVATAR GENERATION FROM DIGITAL MEDIA CONTENT ITEMS

(71) Applicant: Snap Inc., Santa Monica, CA (US)

(72) Inventors: Arnab Ghosh, Oxford (GB); Sergei Gorbatiuk, London (GB); Pavel Savchenkov, London (GB); Sergey Smetanin, London (GB)

(73) Assignee: SNAP INC., Santa Monica, CA (US)

( * ) Notice: Subject to any disclaimer, the term of this patent is extended or adjusted under 35 U.S.C. 154(b) by 114 days.

(21) Appl. No.: 18/347,373

(22) Filed: Jul. 5, 2023

(65) Prior Publication Data

US 2024/0404225 A1     Dec. 5, 2024

Related U.S. Application Data

(60) Provisional application No. 63/504,984, filed on May 30, 2023.

(51) Int. Cl.
| | |
|---|---|
| *G06T 19/20* | (2011.01) |
| *G06F 3/0482* | (2013.01) |
| *G06T 7/73* | (2017.01) |

(52) U.S. Cl.
CPC ............ *G06T 19/20* (2013.01); *G06F 3/0482* (2013.01); *G06T 7/74* (2017.01); *G06T 2200/24* (2013.01); *G06T 2207/20081* (2013.01); *G06T 2207/20084* (2013.01); *G06T 2207/30201* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 5,604,843 A | 2/1997 | Shaw et al. |
| 5,689,559 A | 11/1997 | Park |
| 5,880,731 A | 3/1999 | Liles et al. |
| 6,023,270 A | 2/2000 | Brush, II et al. |

(Continued)

FOREIGN PATENT DOCUMENTS

| | | |
|---|---|---|
| CN | 109863532 | 6/2019 |
| CN | 110168478 | 8/2019 |

(Continued)

OTHER PUBLICATIONS

Hu et al. (Avatar Digitization From a Single Image for Real-Time Rendering, ACM Transactions on Graphics, vol. 36, No. 6) (Year: 2017).*

(Continued)

*Primary Examiner* — Kyle Zhai
(74) *Attorney, Agent, or Firm* — SCHWEGMAN LUNDBERG & WOESSNER, P.A.

(57) ABSTRACT

A system for generating avatars from user self-images is disclosed, whereby the system accesses a media content item of a user that includes a face of the user, analyzes data associated with the media content item using a first machine learning model to generate a first modified media content item, parses a portion of the first modified media content item corresponding to the face of the user, and analyzes data associated with the portion of the first modified media content item using a second machine learning model to generate a digital avatar for the user.

19 Claims, 13 Drawing Sheets

(56) References Cited

U.S. PATENT DOCUMENTS

| RE36,919 E | 10/2000 | Park |
| RE37,052 E | 2/2001 | Park |
| 6,223,165 B1 | 4/2001 | Lauffer |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,762,174 B2 | 9/2020 | Denton et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,010,951 B1 * | 5/2021 | Schwartz ................ G06F 3/012 |
| 11,030,789 B2 | 6/2021 | Chand et al. |
| 11,036,781 B1 | 6/2021 | Baril et al. |
| 11,063,891 B2 | 7/2021 | Voss |
| 11,069,103 B1 | 7/2021 | Blackstock et al. |
| 11,080,917 B2 | 8/2021 | Monroy-hernández et al. |
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-hernández et al. |
| 11,284,144 B2 | 3/2022 | Kotsopoulos et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |

(56) References Cited

U.S. PATENT DOCUMENTS

| | | |
|---|---|---|
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0113956 A1* | 5/2013 | Anderson ............ G06V 10/141 348/E9.051 |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0097958 A1 | 3/2019 | Collet et al. |
| 2019/0188920 A1 | 6/2019 | Mcphee et al. |
| 2019/0280997 A1 | 9/2019 | Baldwin et al. |
| 2019/0340419 A1* | 11/2019 | Milman ................ G06N 20/00 |
| 2020/0045245 A1* | 2/2020 | Van Os ................ H04N 23/611 |
| 2020/0306637 A1 | 10/2020 | Baldwin et al. |
| 2020/0372127 A1 | 11/2020 | Denton et al. |
| 2020/0380074 A1* | 12/2020 | Li .......................... G06N 20/00 |
| 2020/0410575 A1 | 12/2020 | Grantham et al. |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0385180 A1 | 12/2021 | Al Majid et al. |
| 2021/0405831 A1 | 12/2021 | Mourkogiannis et al. |
| 2021/0409535 A1 | 12/2021 | Mourkogiannis et al. |
| 2022/0012929 A1 | 1/2022 | Blackstock et al. |
| 2023/0058793 A1 | 2/2023 | Perazzi et al. |
| 2023/0126695 A1* | 4/2023 | Hatten ................... G06N 3/045 706/15 |
| 2023/0334904 A1* | 10/2023 | Monti ................. G06V 40/172 |
| 2024/0169636 A1* | 5/2024 | Yuan ....................... G06T 13/80 |
| 2024/0185588 A1* | 6/2024 | Kumari ............... G06V 10/778 |
| 2024/0242455 A1* | 7/2024 | Peris ...................... G06T 19/20 |

FOREIGN PATENT DOCUMENTS

| | | |
|---|---|---|
| EP | 2184092 | 5/2010 |
| JP | 2001230801 | 8/2001 |
| JP | 5497931 | 3/2014 |
| KR | 101445263 | 9/2014 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |
| WO | WO-2024249665 A1 | 12/2024 |

OTHER PUBLICATIONS

Genova et al. (Unsupervised Training for 3D Morphable Model Regression, Conference on Computer Vision and Pattern Recognition (CVPR)) (Year: 2018).*

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji", Snapchat Support, [Online] Retrieved from the Internet: <URL: https://web.archive.org/web/20190503063620/https://support.snapchat.com/en-us/a/bitmoji>, (captured May 3, 2019), 2 pgs.

"Manage Your Bitmoji", Snapchat Support, [Online] Retrieved from the Internet: <URL: https://web.archive.org/web/20190503063620/https://support.snapchat.com/en-us/a/manage-bitmoji>, (captured May 3, 2019), 3 pgs.

"Bitmoji Family", Snapchat Support, [Online] Retrieved from the Internet: <URL: https://web.archive.org/web/20190503063620/https://support.snapchat.com/en-us/article/bitmoji-family>, (captured May 3, 2019), 4 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

"Instant Comics Starring You and Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

(56)          References Cited

OTHER PUBLICATIONS

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.

Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How to Add My Friend's Bitmoji to My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How to Add Bitmoji to Customizable Geofilters", International Business Times, [Online] Retrieved from the Internet : <URL: https://www.ibtimes.com/snapchat-update-how-add-bitmoji-customizable- geofilters-2448152>, (Nov. 18, 2016), 6 pgs.

Ruiz, Nataniel, et al., "DreamBooth: Fine Tuning Text-to-Image Diffusion Models for Subject-Driven Generation", arXiv:2208.12242v2 [cs.CV], (Mar. 15, 2023), 25 pgs.

"International Application Serial No. PCT/US2024/031722, International Search Report mailed Oct. 8, 2024", 4 pgs.

"International Application Serial No. PCT/US2024/031722, Written Opinion mailed Oct. 8, 2024", 10 pgs.

Brooks, Tim, et al., "InstructPix2Pix: Learning to Follow Image Editing Instructions", [Online] Retrieved from the internet: <https://arxiv.org/pdf/2211.09800>, (Jan. 18, 2023), 15 pgs.

Galteri, Leonardo, et al., "Deep Generative Adversarial Compression Artifact Removal", IEEE International Conference on Computer Vision, (2017), 10 pgs.

Kochulab, Andrew, "5 Steps to Create AI Avatars Generator like Lensa AI: Stable Diffusion in Action", [Online] Retrieved from the internet: <https://perpet.io/blog/5- steps - to -create-ai- selfies-generator-like-lensa-stablediffusion-in-action/>, (Jan. 19, 2023), 8 pgs.

Li, Tingling, et al., "BeautyGAN: Instance-level Facial Makeup Transfer with Deep Generative Adversarial Network", Multimedia, ACM, 2 Penn Plaza, Suite 701, New York, NY, USA 10121-0701, (Oct. 15, 2018), 9 pgs.

Yue, Dongxu, et al., "ChatFace: Chat-Guided Real Face Editing via Diffusion Latent Space Manipulation", [Online] Retrieved from the internet: <https://arxiv.Org/pdf/2305.14742vl>, (May 24, 2023), 24 pgs.

* cited by examiner

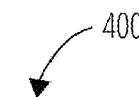

400

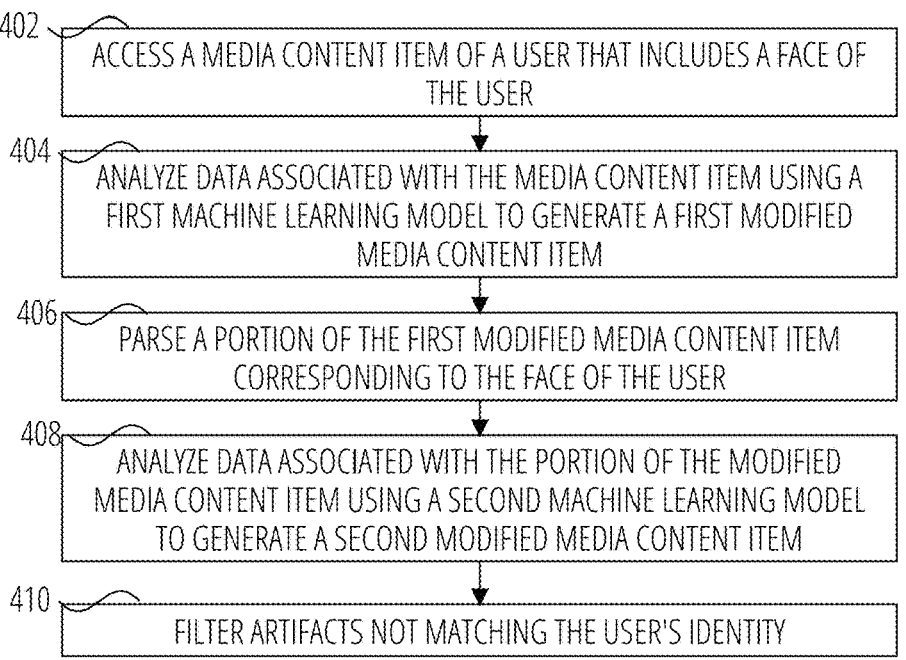

402 — ACCESS A MEDIA CONTENT ITEM OF A USER THAT INCLUDES A FACE OF THE USER

404 — ANALYZE DATA ASSOCIATED WITH THE MEDIA CONTENT ITEM USING A FIRST MACHINE LEARNING MODEL TO GENERATE A FIRST MODIFIED MEDIA CONTENT ITEM

406 — PARSE A PORTION OF THE FIRST MODIFIED MEDIA CONTENT ITEM CORRESPONDING TO THE FACE OF THE USER

408 — ANALYZE DATA ASSOCIATED WITH THE PORTION OF THE MODIFIED MEDIA CONTENT ITEM USING A SECOND MACHINE LEARNING MODEL TO GENERATE A SECOND MODIFIED MEDIA CONTENT ITEM

410 — FILTER ARTIFACTS NOT MATCHING THE USER'S IDENTITY

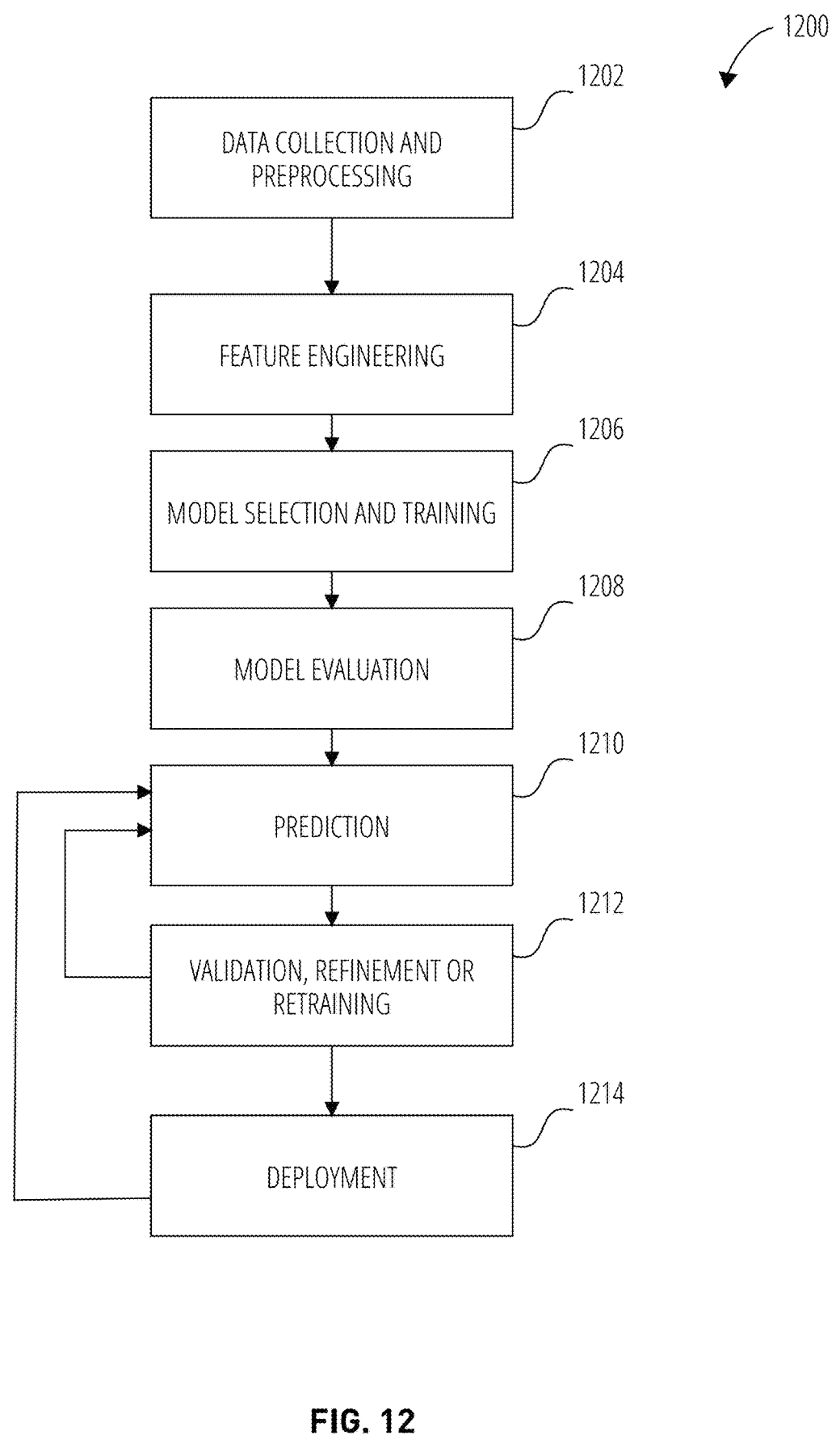

DATA COLLECTION AND
PREPROCESSING

1204

FEATURE ENGINEERING

1206

MODEL SELECTION AND TRAINING

1208

MODEL EVALUATION

1210

PREDICTION

1212

VALIDATION, REFINEMENT OR
RETRAINING

1214

DEPLOYMENT

FIG. 12

AVATAR GENERATION FROM DIGITAL MEDIA CONTENT ITEMS

CLAIM OF PRIORITY

This application claims the benefit of priority to U.S. Provisional Application Ser. No. 63/504,984, filed on May 30, 2023, which is incorporated herein by reference in its entirety.

TECHNICAL FIELD

The present disclosure relates generally to avatars, and more specifically to the generation of avatars from digital media content items.

BACKGROUND

Avatars have gained popularity in recent years due to several factors that cater to the evolving needs of users in the digital world. Avatars enable users to create a digital representation of themselves, offering a unique and customized presence in online spaces. This personal touch allows users to express their identity and personality in a way that static images or text cannot. Also, by representing themselves through an avatar, users can protect their real-life identity while still engaging with others in a meaningful way. Moreover, immersive experiences, such as virtual reality (VR) and augmented reality (AR) technologies, has driven demand for avatars that can interact in these environments. Their increasing adoption in various applications and platforms reflects the growing demand for more engaging and immersive digital experiences.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which:

FIG. 4 illustrates an example flowchart for generating a modified self-image of a user, according to some examples.

FIG. 11 is a block diagram showing a software architecture within which examples may be implemented.

FIG. 12 illustrates a machine-learning pipeline, according to some examples.

DETAILED DESCRIPTION

Figure 1:
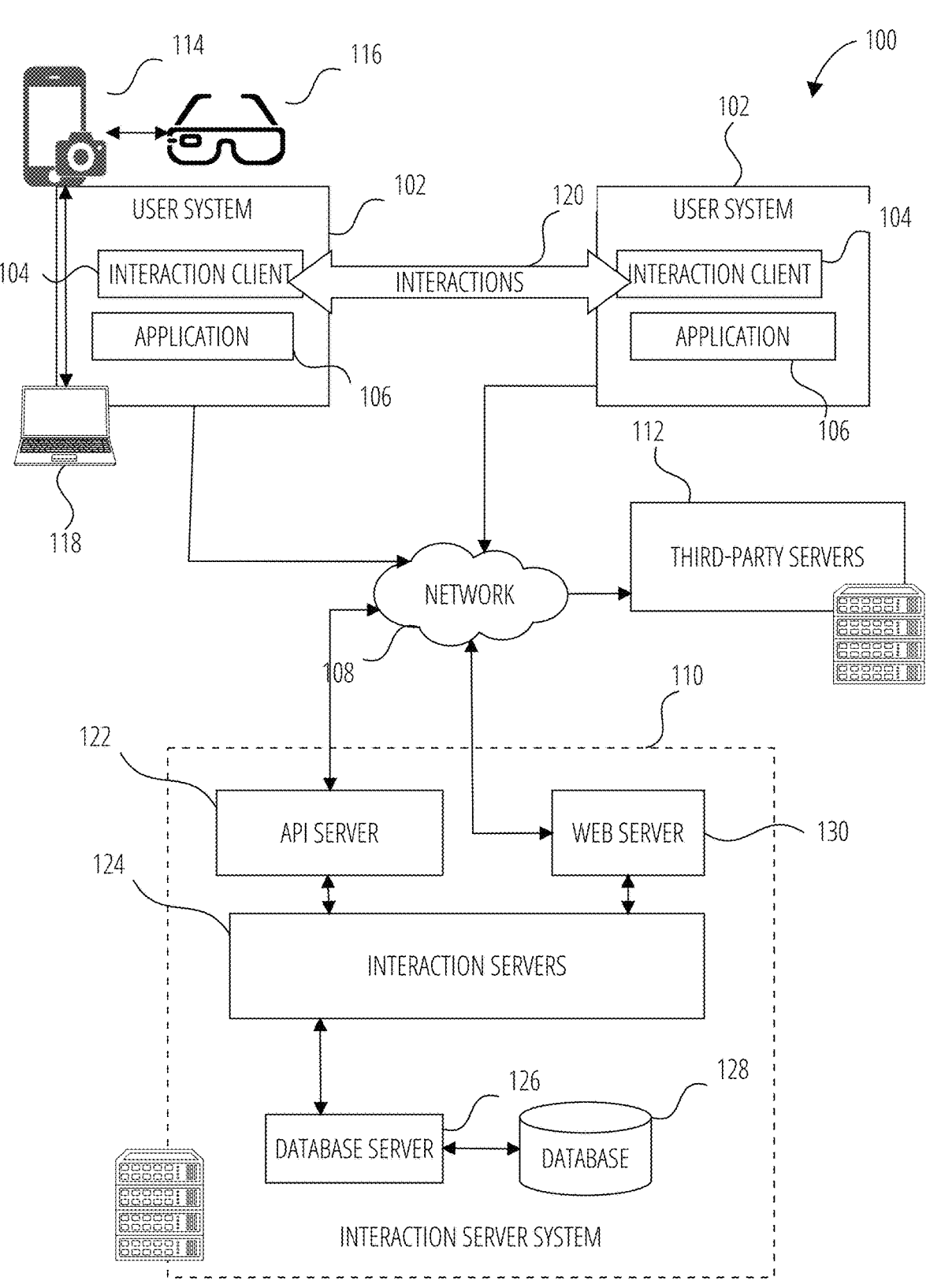
FIG. 1 is a diagrammatic representation of a networked environment in which the present disclosure may be deployed, according to some examples.

Avatars are widely used in various applications to provide a more personalized and engaging user experience. For example, avatars are used as profile pictures and can be customized to resemble users' appearances, with a range of facial features, hairstyles, and clothing options. Moreover, users can create their own personalized stickers using avatars, offering more engaging communication options. Players can also customize their in-game avatars with various skins, emotes, and accessories, enabling them to express their personalities in the virtual world. Content augmentations and filters are also used by users to transform their faces into avatars, creating fun and interactive multimedia experiences.

However, traditional methods and systems for avatar generation pose significant challenges. These systems train machine learning models in real-time using received self-images inputted by a user. Real-time training fine-tunes the machine learning model to generate modified self-images custom tailored to the user.

However, such real-time training is time-consuming, especially if the models are complex and the datasets are large. This can lead to latency issues affecting user experience, especially in applications where immediate response is expected.

Another challenge is the preservation of the user's identity in the generated avatar. The models are trained in real-time based on a limited set of user inputted self-images, causing the traditional systems to not accurately capture the unique features of the user's face, making the user unrecognizable in the avatar.

Real-time training of models is also resource-intensive, requiring high computational power, which could limit the accessibility of such features to users with less powerful devices. This is particularly an issue for large-scale applications with many users. Moreover, this approach also requires large data storage, as models' parameters for each individual user need to be saved.

In addition, real-time model training on a small set of user self-images is prone to overfitting issues, where a model learns the specific details and noise in the training data to the extent that the model applies higher weights on undesirable features. Such training also limits the offering of style variety and results in inconsistent quality, especially if the user's self-images are of varying quality or if they include challenging conditions such as different lighting or angles.

To overcome these limitations and challenges, the disclosed interaction systems, in some cases, apply a first machine learning model to a user's self-image to generate a stylized first modified self-image. The system parses a face area in the first modified self-image corresponding to a face of the user. Then, the parsed image is applied to a second machine learning model to generate a second modified self-image that includes other features and that is used as an avatar of the user. The machine learning models is trained to process different types of media, such as videos, 3D models, content augmentations, and/or the like.

The use of the machine learning models eliminates the need for real-time training, which significantly reduces the time required to generate avatars, leading to an improved user experience. The disclosed systems separate the avatar generation process into two stages, where the first stage (including the first machine learning model and face parsing techniques) focuses on the face of the user, and the second stage (including the second machine learning model) focuses on the remaining features of the image. This contributes to improved identity preservation compared to traditional methods.

The two-stage process is more computationally efficient by requiring less computational power and memory, making it more scalable for large-scale applications and accessible to users with less powerful devices. The disclosed interaction system also doesn't require storage of personalized models for each user, reducing data storage needs.

Moreover, using two separate models reduces the risk of overfitting, since the models are not being overly fine-tuned on a limited set of user-inputted images. The use of different models for stylization and generation also allows for more style variety in the produced avatars. Another benefit of parsing the face area from the first modified self-image before applying it to the second model is consistent quality of identification preservation. A further advantage is the ability to generate avatars with the use of less input images, as more images are needed to properly train models in real-time using traditional systems.

In summary, the proposed interaction system offers significant improvements over traditional methods in terms of speed, identity preservation, scalability, quality, and style variety, making it a superior solution for efficient and high-quality avatar generation.

When the effects in this disclosure are considered in aggregate, one or more of the methodologies described herein may improve known systems, providing additional functionality (such as, but not limited to, the functionality mentioned above), making them easier, faster, or more intuitive to operate, and/or obviating a need for certain efforts or resources that otherwise would be involved in an avatar generation process. Computing resources used by one or more machines, databases, or networks may thus be more efficiently utilized or even reduced.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Programming Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the other interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 hosts multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from third-party servers 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different applications 106 (or applets) can vary based on how the menu is launched by the user (e.g., from a conversation interface or from a non-conversation interface).

System Architecture

Figure 2:
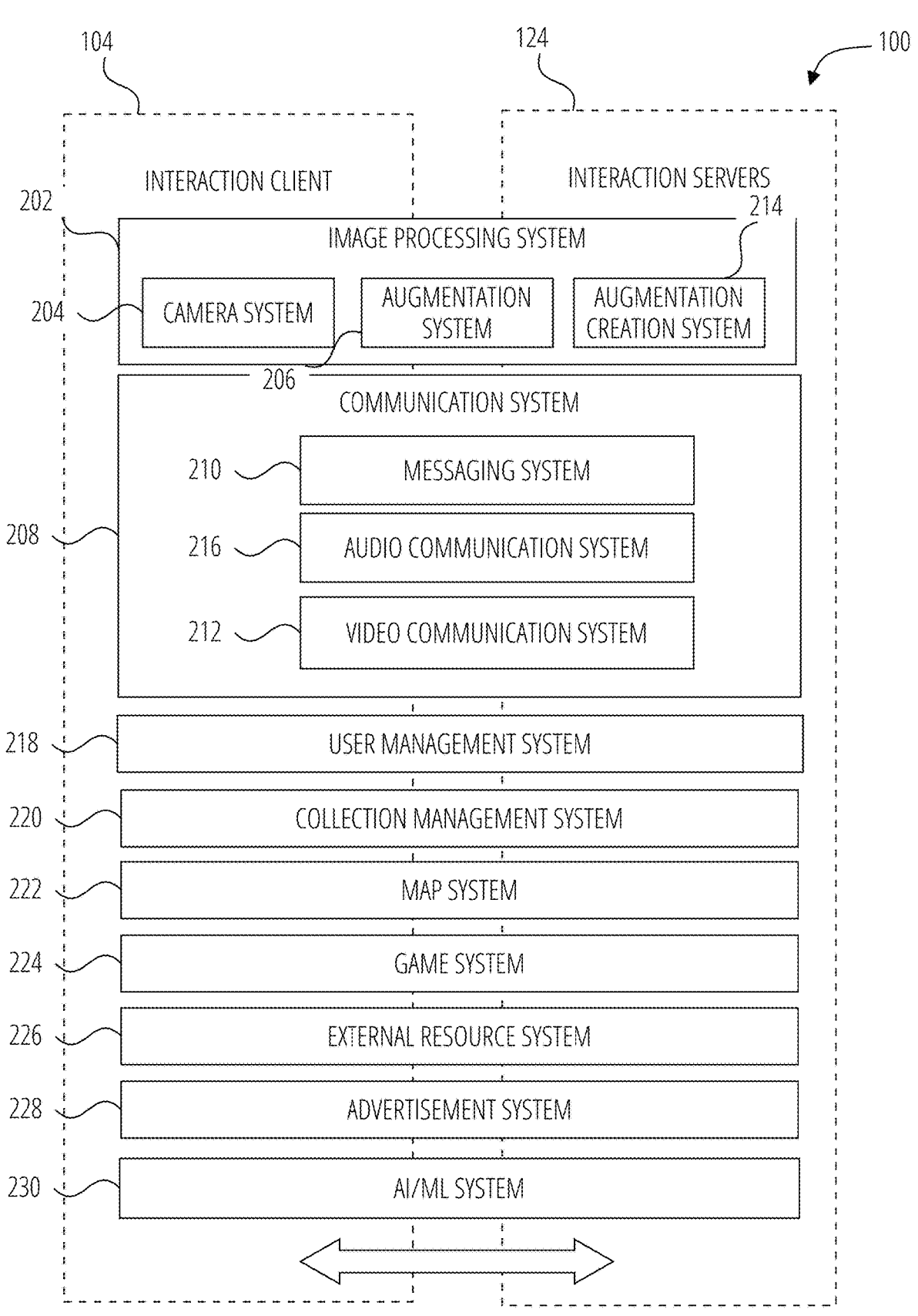
FIG. 2 is a diagrammatic representation of an interaction system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of a microservice subsystem may include:

Function logic: The function logic implements the functionality of the microservice subsystem, representing a specific capability or function that the microservice provides.

API interface: Microservices may communicate with other component through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 902 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 hosts a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface (GUI) of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

Data Architecture

Figure 3:
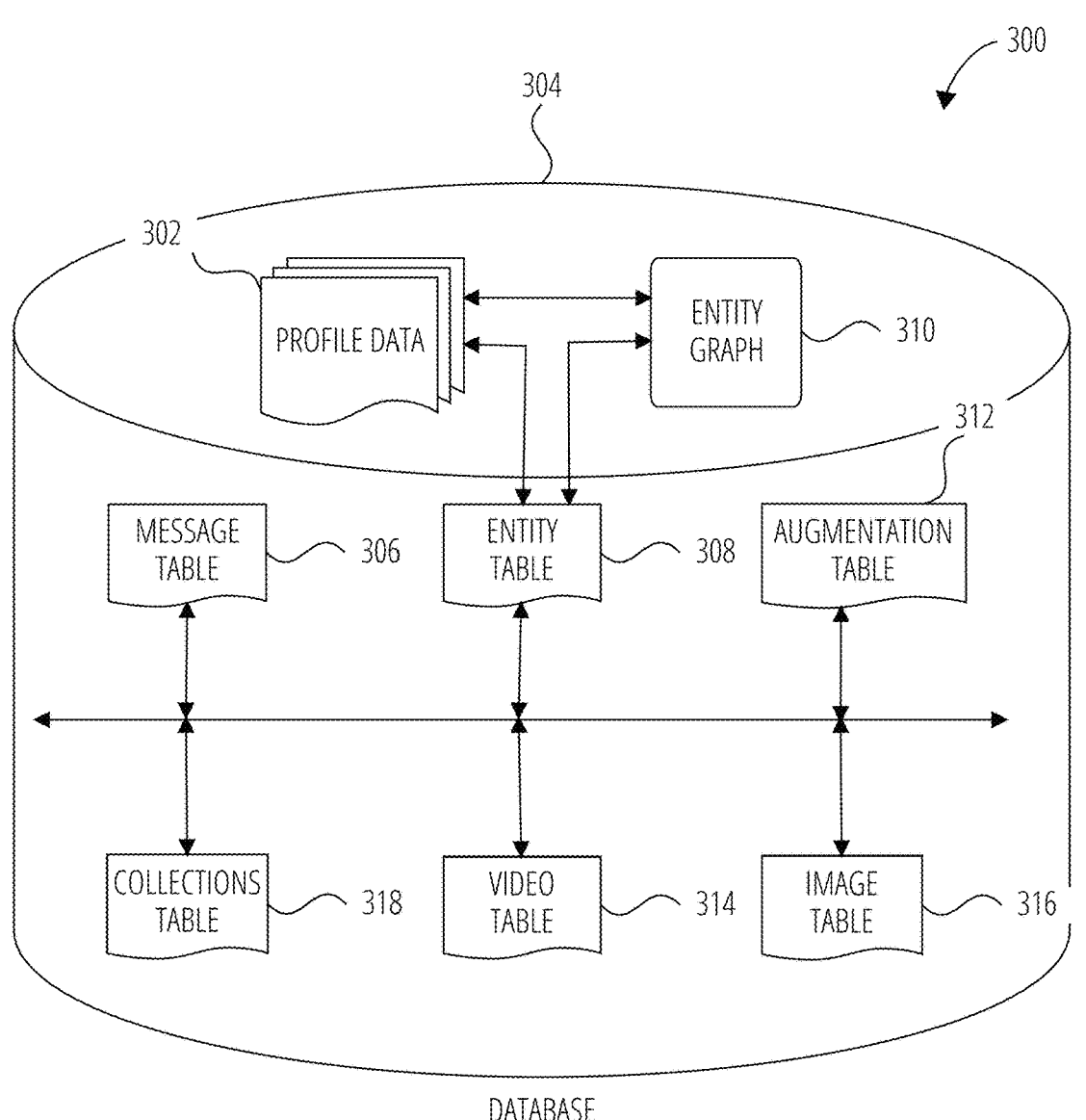
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message and included within the message data stored in the message table 306, are described herein with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100. A friend relationship can be established by mutual agreement between two entities. This mutual agreement may be established by an offer from a first entity to a second entity to establish a friend relationship, and acceptance by the second entity of the offer for establishment of the friend relationship.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of the user system 102 and then displayed on a screen of the user system 102 with the modifications. This also includes modifications to stored content, such as video clips in a collection or group that may be modified. For example, in a user system 102 with access to multiple augmented reality content items, a user can use a single video clip with multiple augmented reality content items to see how the different augmented reality content items will modify the stored clip. Similarly, real-time video capture may use modifications to show how video images currently being captured by sensors of a user system 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated. Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation. In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

The system can capture an image or video stream on a client device (e.g., the user system 102) and perform complex image manipulations locally on the user system 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user system 102.

In some examples, the system operating within the interaction client 104 determines the presence of a face within the image or video stream and provides modification icons associated with a computer animation model to transform image data, or the computer animation model can be present as associated with an interface described herein. The system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Generating Modified Self-Image, Such as an Avatar, of a User

FIG. 4 illustrates an example flowchart 400 for generating a modified self-image of a user, according to some examples. Although the example flowchart 400 depicts a particular sequence of operations, the sequence may be altered without departing from the scope of the present disclosure. For example, some of the operations depicted may be performed in parallel or in a different sequence that does not materially affect the function of the flowchart 400. In other examples, different components of an example device or system that implements the flowchart 400 may perform functions at substantially the same time or in a specific sequence.

FIG. 4 is described as being performed by certain systems and/or particular processes, such as a particular machine learning model or computer vision model, but the processes described herein can be performed by one or more other or the same machine learning models, computer vision models, or a combination thereof.

Features of FIG. 4 are described as being applied to a user's self-image and face. However, such features can be applied to other objects detected in an image or video, such as a body, a pet, a tree, a background, and/or the like. Moreover, the two stage process can be applied to other portions of the user or object, such as the first stage modifying a particular facial feature or arms of a chair, and the second stage modifying one or more other features, such as another facial feature or the seat of the chair.

At operation 402, the method includes accessing a media content item of a user that includes a face of the user. For example, a media content item includes a self-image of a user, whereby the user takes an image of the user's own face using a camera system on an interaction client 104 of the user. In some cases, the media content items include types other than images such as:

Emojis that are small images or icons that represent emotions, reactions, or objects.

Stickers that are larger images or animations that can be sent in a chat window.

Photographs that can be sent to other users to share visual information or document a particular event.

Video clips that can be used to share recorded content or document a particular event.

Audio messages that can be shared to communicate audible communication.

Graphics Interchange Formats (GIFs) that are short animations that can be used to add humor or express emotions.

The interaction system accesses the media content item from use of one or more interaction functions of the user via the interaction system 100. In some cases, interaction functions include a chat window, a camera feed, content augmentations, data from Extended Reality (XR) devices, and/or the like. XR is an umbrella term encapsulating Augmented Reality (AR), Virtual Reality (VR), Mixed Reality (MR), and everything in between. For the sake of simplicity, examples are described using one type of system, such as XR or AR. However, it is appreciated that other types of systems apply.

In some cases, the interaction system accesses an image or video that includes a user's face on an interaction client's photo library or gallery. In some cases, the interaction client accesses a profile picture of the user or images from other platforms that are linked to the interaction system, such as other platforms enabling users to post images for other viewers.

At operation 404, the method includes analyzing data associated with the media content item using a first machine learning model to generate a first modified media content item. The first machine learning model performs initial processing of the user's self-image.

The first machine learning model takes the user's self-image as input and applies a transformation which generates a stylized version of the original self-image (referred to herein as the first modified self-image or first modified media content item). The transformation involves one or more changes in style, color, texture, and/or the like. In some cases, the first machine learning model applies modification on a portion or the whole face of the user. In some cases, the first machine learning model applied modification on more than the face of the user, such as the background and body.

In some cases, the initial transformation is performed by the first machine learning model to stylize the image in a way that preserves the essential details, such as the pose or facial features of the user, while still providing other modifications to the image. As such, the first machine learning model preserves the identity of the user in the image.

In some cases, the input and output of the first machine learning model includes the user in the same pose. For example, the original image displays a pose of a user, and the first machine learning model outputs a modified image (such as a user with new facial hair) but with the user remaining in the same pose. In some cases, the input and output of the second machine learning model also includes the user in the same pose.

In some cases, even though the image is stylized, the model is trained to retain key facial features so that the resulting avatar maintains the user's identity. The model ensures the stylization does not distort the user's features to the point of unrecognizability. In some examples, the model determines to fully maintain certain facial features and/or reduce the modification of one or more of the following features while enabling or amplifying modification on other facial features in order to maintain the user's identity.

Facial features include the overall shape of a person's face (e.g., round, oval, square, heart-shaped) and the proportions of the face (e.g., the relative positions and sizes of the eyes, nose, and mouth); the size, shape, and color of the eyes, the distance between them, and the shape and color of the eyebrows; the size and shape of the nose, including the bridge, nostrils, and tip; the shape, size, and color of the lips, as well as the shape of the mouth when smiling or in a neutral expression; hair color, style, texture, and length; skin color and texture, as well as any distinctive marks like freckles, moles, or scars; the shape and prominence of cheekbones; the shape of the chin and the contour of the jawline; the size, shape, and position of the ears; and/or the like.

The first machine learning model performs one or more transformations on a user's face. In some examples, the first machine learning model applies the artistic style of one image (such as a famous painting) to the user's self-image, which results in transformations to the color palette, brush strokes, texture, and overall aesthetic. The first machine learning model modifies specific facial features in the image. For example, the model enlarges or shrinks eyes, modifies the shape of the nose, or adjusts the width of the mouth.

In some cases, the first machine learning model simulates the effects of aging or makes the person appear younger than they are. The first machine learning model alters the user's facial expression in the image, making the user appear to smile, frown, look surprised, and/or the like. The first machine learning model adjusts the lighting conditions, contrast, and brightness in the image. The first machine learning model modifies the user's face to present a different gender. The first machine learning model adds or removes facial hair, such as beards or mustaches.

In some cases, the first machine learning model includes a deep learning technique used for image-to-image translation tasks in order to stylize a user's self-images. In some examples, the first machine learning model includes a deep learning method that uses control points to guide the mapping between input and output images. In the context of stylizing self-images, the first machine learning model is used to establish key facial landmarks in the input self-image and map them to corresponding landmarks in the target style. By doing this, the model learns to generate a new image while preserving the facial structure and features of the original self-image.

In some cases, the first machine learning model includes a conditional generative adversarial network (cGAN) that performs image-to-image translation. The first machine learning model includes a generator network that creates the output image and a discriminator network that judges whether the generated image is real or fake. The generator and discriminator are trained together in a process where the generator tries to create realistic images, and the discriminator tries to distinguish between real and fake images. The generator improves over time as it learns to create better images based on feedback from the discriminator.

In some cases, the first machine learning model is trained in a supervised learning setting where the model relies on a dataset containing pairs of input-output images to learn the desired mapping. As such, the first machine learning model is trained to perform image-to-image translations from an input image into a stylized version based on a target style.

At operation 406, the interaction system parses at least a portion of the first modified media content item corresponding to a certain feature, such as a face of the user. The interaction system applies an object detection method (such as a computer vision model) that is trained to recognize specific objects, such as faces or heads, and parse just the desired object, such as the head, from the rest of the image. Certain object detection methods scan the image at different scales and positions to identify the object of interest.

In some examples, the system applies techniques that extract features from the image, which capture the distribution of gradient directions in localized regions, which are then fed into a classifier to detect objects like heads or faces. In some examples, the system applies Convolutional Neural Networks (CNN), which include multiple layers that learn to recognize features in the input image. Pre-trained CNN models are fine-tuned for head or face detection tasks by training on labeled datasets.

In some examples, the system applies a real-time object detection technique that uses a single CNN to both propose object regions and classify them simultaneously, which are trained for head detection tasks using labeled datasets. In some examples, the system can apply another real-time object detection method that processes the entire image in a single pass by dividing the input image into a grid and assigning bounding boxes and class probabilities to each grid cell.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection are used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects.

In some examples, a set of landmarks forms a shape. Shapes are represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

At operation 408, the interaction system analyzes data associated with the portion of the modified media content item corresponding to the face of the user using a second machine learning model to generate a second modified media content item. In some cases, the interaction system applies the parsed head portion of the stylized modified self-image into the second machine learning model. The second machine learning model is trained to further refine the stylized and parsed image generated by the first model, such as by adding and/or further modifying the parsed head.

The parsed self-image outputted by the first machine learning model is applied to the second machine learning model. In some cases, the second machine learning model focuses on enhancing the details and quality of the avatar, ensuring the stylized image still maintains recognizability and resemblance to the original self-image. The second machine learning model maintains facial features or reduce modifications of facial features, as further described herein.

The second machine learning model maintains facial features or reduce modifications of facial features similarly with the first machine learning model. For example, the first and second machine learning models maintain the size of the eyes while making modifications to the eye lashes. In other examples, the second machine learning model maintains facial features or reduce modifications of facial features differently than the first machine learning model. In some examples, the second machine learning model maintains facial features or reduce modifications of facial features for certain types of facial features the same way as the first machine learning model, but modifies other facial features differently than the first machine learning model.

In some cases, the second machine learning model uses denoising score matching and contrastive divergence. The second machine learning model is trained in an unsupervised learning setting. The second machine learning model learns to generate images by simulating a diffusion process that gradually transforms the input image into a noisy version and then reverses the process to reconstruct the original image.

The second machine learning model focuses on maintaining the stability of the diffusion process and allows for a more controlled and consistent transformation of images. The second machine learning model learns the image generation process in an unsupervised manner by reconstructing the input images from their noisy counterparts.

Systems and methods described herein include training a machine learning network, such as training to generate modified media content items. The machine learning network is trained to generate a modified media content item from an original image of a user, and/or to generate a remodified media content item from an already modified face portion of an image. The machine learning algorithm is trained using historical information that includes historical media content items and resulting modified media content items. The machine learning algorithm is trained by applying historical prompts (as described further herein).

Training of models, such as artificial intelligence models, is necessarily rooted in computer technology, and improves modeling technology by using training data to train such models and thereafter applying the models to new inputs to make inferences on the new inputs. Here, the new inputs are a new image of a user uploaded to the interaction client and/or other media content items such as a live camera feed or a stored video.

Such training involves complex processing that typically requires a lot of processor computing and extended periods of time with large training data sets, which are typically performed by massive server systems. Training of models require logistic regression and/or forward/backward propagating of training data that include input data and expected output values that are used to adjust parameters of the models. Such training is the framework of machine learning algorithms that enable the models to be applied to new and unseen data (such as new image or media content item data) and make predictions that the model was trained for based on the weights or scores that were adjusted during training. Such training of the machine learning models described herein reduces false positives and increases the performance of generating modified media content items.

At operation 410, the interaction system filters artifacts that do not match the user's identity. The interaction system applies a third machine learning model trained to identify and remove artifacts. The third machine learning model is trained on a large dataset of images, where each image is labeled with information about whether the image contains an artifact and the location of the artifact. Once trained, the third machine learning model is used to identify and remove artifacts in new images.

In some cases, the interaction system uses facial recognition models to compare the generated avatar to the original image of the user. The facial recognition models extract key features (such as facial features further described herein) from both images and compares them. If significant differences are identified (such as features present in the avatar that do not match the user's image), these facial features are flagged as potential artifacts.

In some cases, the interaction system compares the original and the modified images by creating a difference map. The difference map highlights areas of the modified image that have changed significantly from the original.

In some cases, the interaction system applies Generative Adversarial Networks (GANs) where two neural networks contest with each other. A generator network creates avatars and a discriminator network evaluates the avatars for authenticity (such as based on how well the avatars match the user's identity). If the discriminator identifies an avatar as having non-matching features (such as artifacts), the generator learns from these mistakes to improve the next iteration.

Generating a Hunter in the Wilderness Avatar

Figure 5:
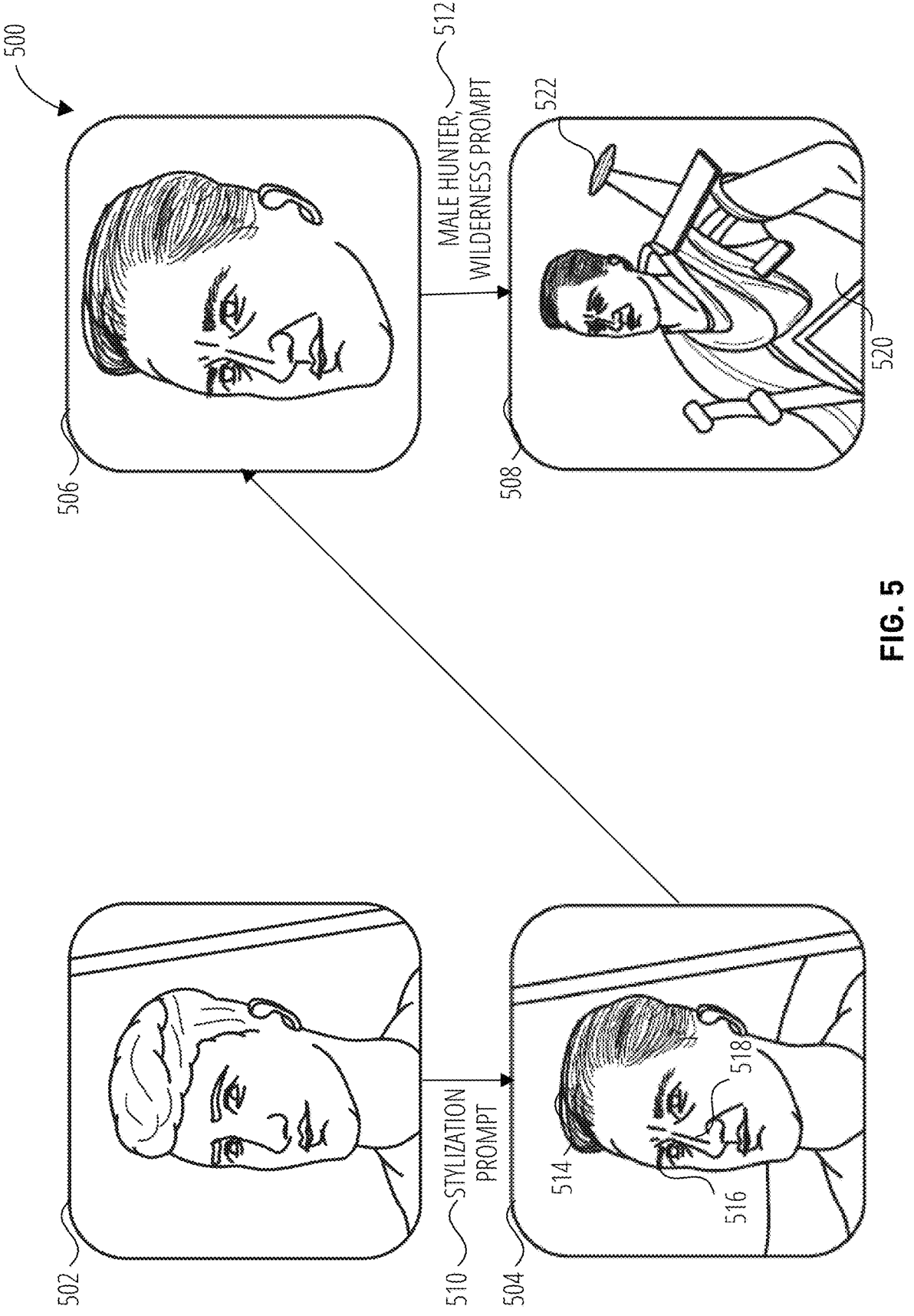
FIG. 5 illustrates an example for generating an avatar, according to some examples.

FIG. 5 illustrates an example 500 for generating a "hunter in the wilderness" avatar, according to some examples. In the example of FIG. 5, the interaction client 104 applies one or more operations of FIG. 4 in order to generate the avatar. The example 500 includes a self-image 502, a stylized image 504, a parsed image 506 of the head of the user, and an avatar 508.

The user opens a camera feed of a camera system on the user's interaction client 104, where the user takes a self-image 502 of the user. The self-image 502 includes an image of the user within the image boundaries. The system then has access to the self-image 502, such as in operation 402 where the system accesses a media content item that includes a face of the user.

The interaction client 104 then applies the self-image 502 to a first machine learning model in order to generate a modified self-image, such as the stylized image 504, similar to operation 404 where the interaction client 104 analyzes the data associated with the media content item using the first machine learning model to generate a first modified media content item.

The interaction system then parses the stylized image 504 to capture the face of the user. In some examples, the interaction system parses a portion of the user, such as the face without the hair, only the head and the neck, the face without the ears, and/or the like. Similar to operation 406, the interaction system parses a portion of the first modified media content item corresponding to the user's face.

The interaction system then inputs the parsed image 506 of the user into a second machine learning model to generate the avatar 508. Similar to operation 408, the interaction system analyzes data associated with the parsed face of the first modified media content item to generate a second modified media content item that includes the avatar 508.

In some cases, the first machine learning model and/or the second machine learning model also identifies a prompt of the user. The prompt indicates an intent of the user for the image. For example, a particular stylization prompt 510 is inputted into the first machine learning model and/or a second "male hunter, wilderness" prompt 512 is inputted into the second machine learning model. In some cases, the prompts are predefined, such as a list of prompts each corresponding to a particular style (e.g., medieval, skeleton, old age).

Prompt 510 includes a predefined aging prompt such that the original self-image 502 is modified to include modifications to make the user look older. As shown in FIG. 5, the stylized image 504 includes the user of the self-image 502 with a modified hair style 514, eyebrows 516, and nose shape 518, while still maintaining other facial features, such as the overall face shape, lips, ears, and/or the like.

The second "male hunter, wilderness" prompt 512 is inputted into the second machine learning model and the avatar 508 includes a hunter's clothing 520, a hunter's weapon 522, and/or the like. The second machine learning model generates additional content (e.g., surrounding the face of the user), such as a background, full body, upper body, accessories, and/or the like.

In some cases, identifying the prompt for the user includes receiving a question or request from the user via text or speech. The interaction system identifies keywords from the prompt and applies weights to each of the identified keywords. The interaction system applies the identified keywords and corresponding weights to the first and/or second machine learning model.

In some examples, the interaction system generates the prompt for the user automatically based on an intent identified from real-time interaction data captured by the interaction client. The interaction system generates prompts for a user based on a user's past activity, interests, and behavior patterns. The interaction system generates personalized prompts related to topics the user may find appealing, such as if a user frequently interacts with a certain type of content about technology.

In some examples, the interaction system uses popular or trending topics from the platform or the wider internet to create prompts that are likely to be of interest to a broad audience. In some examples, by utilizing a user's geographic location, the interaction system generates prompts that are relevant to their local area, such as events, news, or cultural topics.

In some examples, the interaction system creates prompts based on the time of day, season, or upcoming events or holidays, such as events that are time sensitive. In some examples, the interaction system uses the user's social connections to generate prompts related to their friends, family, or other users they follow, such as a birthday or new connection with another user. In some examples, based on the user's activity within a specific application or AR experience, the interaction system generates prompts related to that context.

In some examples, the interaction system uses the user's in-application actions, such as likes, comments, and shares, to generate prompts related to their interests. For example, if a user frequently interacts with content about cooking in a recipe application, the interaction system generates a prompt to create an avatar with the user's favorite dish.

In some examples, by utilizing sensors and data from the user's mobile device or AR headset, the interaction system creates context-aware prompts based on their physical environment. In some examples, the interaction system generates prompts based on real-time events occurring within the application or AR experience, such as a live-streamed event. In some examples, the real-time interaction data includes a current camera feed from a camera system of the interaction client 104.

In some examples, the interaction system uses the user's past activity, preferences, and behavior patterns within the application or AR experience to generate a prompt for the user. In some examples, the interaction system gathers user profile information, such as a calendar of appointments or objects detected in a camera feed of an AR device, to generate a prompt. In some examples, by incorporating gamification elements, the interaction system creates prompts that encourage user participation and engagement, such as checking on a feature within a game.

The application of a prompt indicative of a user's intent plays a significant role in shaping the output of the model to be more customized and relevant. A prompt guides the machine learning model's output by setting a specific direction or goal. For instance, if the user's prompt is to generate an avatar in a "cartoon" style, the model will use this information to influence the style of the generated avatar.

A prompt helps personalize the output to the user's unique preferences. For example, a user might prompt the model to generate an avatar with "blue hair" or "glasses." The model takes these specific details into account when generating the avatar.

Prompts provide important context that helps the model generate more relevant content. For instance, if the user's prompt specifies that they want an avatar suitable for a professional setting, the model uses this context to generate a more formal-looking avatar.

Prompts also enable an interactive process where the user progressively refines the output. For example, after seeing an initial modified image, a user provides a new prompt to adjust specific aspects, such as "make the hair curlier" or "change the shirt color to green". The model then applies these changes to generate a new avatar that more closely matches the user's vision.

Moreover, prompts help prevent unwanted or inappropriate outputs. If a user specifies in their prompt what they don't want (e.g., "no facial hair"), the model uses this information to avoid generating avatars that include these features. As such, a prompt either received from the user or generated from contextual information of the user guides the machine learning model to provide much more highly customized and relevant modifications to media content items.

In some examples, a text is generated from the image, such as using an image-to-text generator (e.g., part of a machine learning model described herein, a separate machine learning model, and/or an image-to-text computer vision model). The system can generate a prompt based on such text.

Image-to-text models, specifically ones designed for faces, apply computer vision and/or machine learning techniques to analyze images of a person's face and then generate descriptive text. These models extract facial features such as age, gender, hair color, and expressions, and may also identify accessories like glasses or hats. In some cases, the models infer emotions sentiment, or other characteristic of the user (e.g., suggest a possible profession based on clothing or background context). The output is a descriptive text that provides a detailed interpretation of the individual's face in the image. The descriptive text can include features (e.g., facial features) as further described herein.

In some cases, the input to the system includes text, such as a description on a desired figure. The system inputs the text into a first machine learning model trained to generate an image of a face. The output of image of the face is either applied to a second machine learning model and/or a prompt or textual description that is generated using the output image is inputted into a second machine learning model to generate the final image.

Generating Stylized Media Content Items

Figure 6:
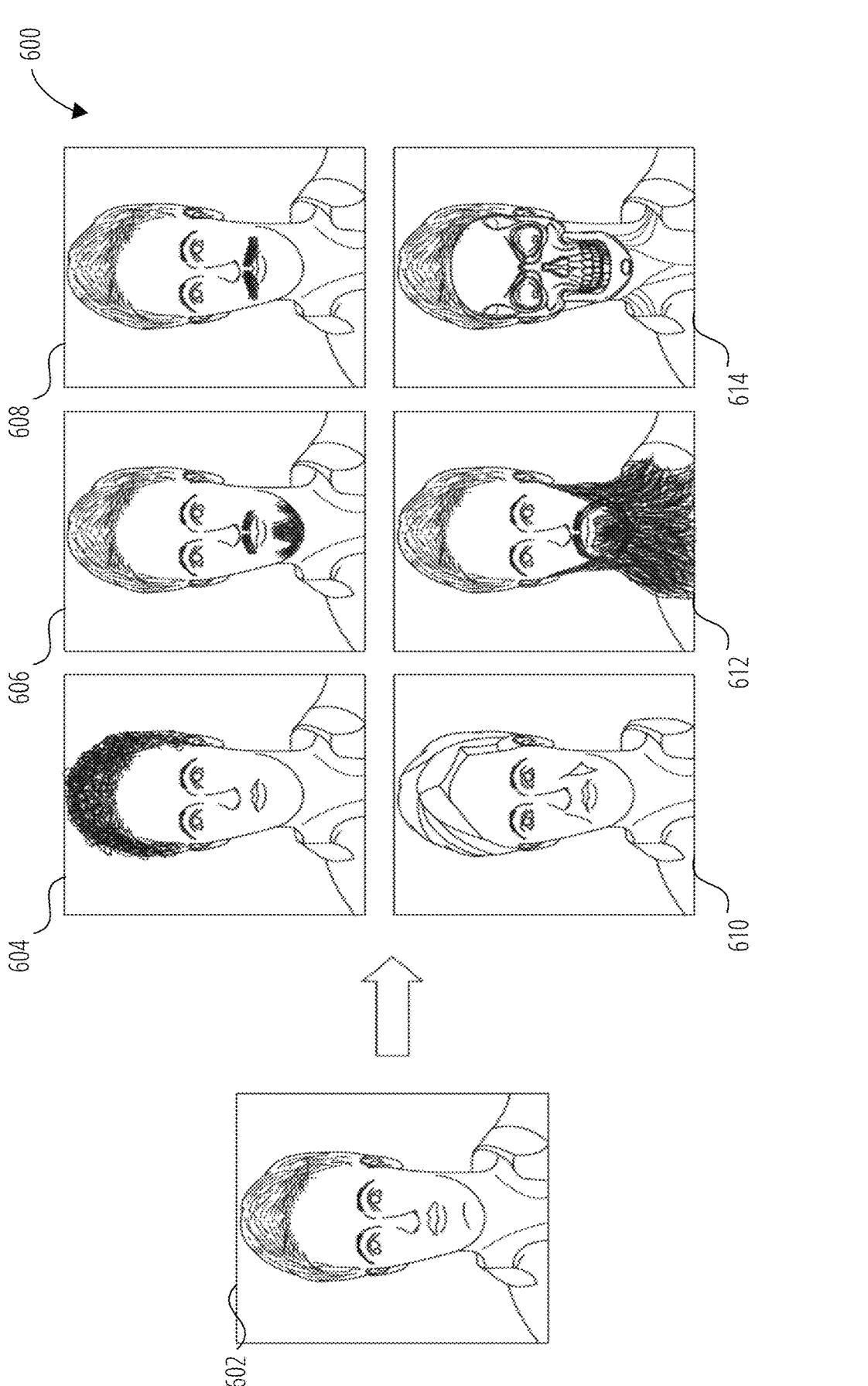
FIG. 6 illustrates the generation of stylized media content items, according to some examples.

FIG. 6 illustrates the generation of stylized media content items 600, according to some examples. FIG. 6 illustrates such generation based on operation 404 of FIG. 4 using the first machine learning model.

In some examples, the interaction client 104 receives a media content item 602 displaying a user. For example, the media content item 602 includes an image of the user, a live camera feed showing a user, a 2D or 3D avatar of the user, and/or the like.

The interaction client 104 processes the media content item 602 using a first machine learning model to generate one or more stylizFed media content items that are modified from the original media content item 602. The first modified media content item 604 changes the hair style of the original media content item 602, a second, third, and fifth media content item 606, 608, and 612 adds facial hair, a fourth modified media content item 610 changes the real life image of the original media content item 602 into a virtualized model, and a sixth modified media content item 614 modifies the real life human face of the original media content item 602 to augment the face with a skull.

In some examples, the selection of the modified media content item to be applied to the second machine learning model is based upon a user selection. In some examples, the selection of the modified media content item to be applied to the second machine learning model is based on a generated prompt, contextual information of the user, an assessment of which image appears to be real (such as by using cGAN as described further herein), and/or the like. For example, the interaction system determines that the first modified media content item 604 appears to align best with a generated prompt for the user.

Figure 7:
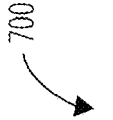
FIG. 7 illustrates generation of avatars for the user, according to some examples.

FIG. 7 illustrates generation of avatars for the user 700, according to some examples. FIG. 7 illustrates such generation based on operation 408 of FIG. 4 using the second machine learning model. A modified media content item 702 is selected to be applied to a second machine learning model, such as the second modified media content item 606 of FIG. 6. The second machine learning model outputs one or more remodified media content items.

The remodified media content items 704, 706, 708, 710, 712, 714 (or the second set of modified media content items) is of the same or different format of the original media content item. In some examples, the original media content item and the remodified media content items 704, 706, 708, 710, 712, 714 are images. In some examples, the original media content item is an image, the first remodified media content item 704 is a 2D avatar, the second remodified media content item 706 is a 3D avatar, the third remodified media content item 708 is a content augmentation, and/or the like.

In some examples, the second machine learning model generates a content augmentation that is automatically applied to a camera feed. In some examples, the second machine learning model generates the fourth remodified media content item 710 that augments an astronaut suit onto a user identified on a camera feed.

In some examples, the interaction system causes display of a first selectable user interface element associated with a remodified media content item. In some examples, the interaction system displays the first selectable user interface element adjacent to an indication of the remodified media content.

In other examples, the interaction system includes an embedded selectable user interface element, such as an embedded user interface element around the border of the first remodified media content item 704, such that the user selects anywhere within the border to initiate the function of the first selectable user interface element.

The interaction client receives a user selection of the selectable user interface element indicating that the user desires to send a message with a content augmentation to a second user. In response to the user selection, the interaction client initiates opening of the camera system to capture the real-time video feed and displays the real-time video feed on a user interface of the interaction client.

The interaction client applies the content augmentation upon opening of the camera system. The interaction system actively applies the content augmentation to the real-time video feed by displaying, on the user interface, the user and digital items that are overlaying, modifying, or otherwise augmenting the real-time video feed. The first user selects another user interface element to capture a video or picture of the real-time video feed modified with the digital items to send to the second user.

Data Communications Architecture

Figure 8:
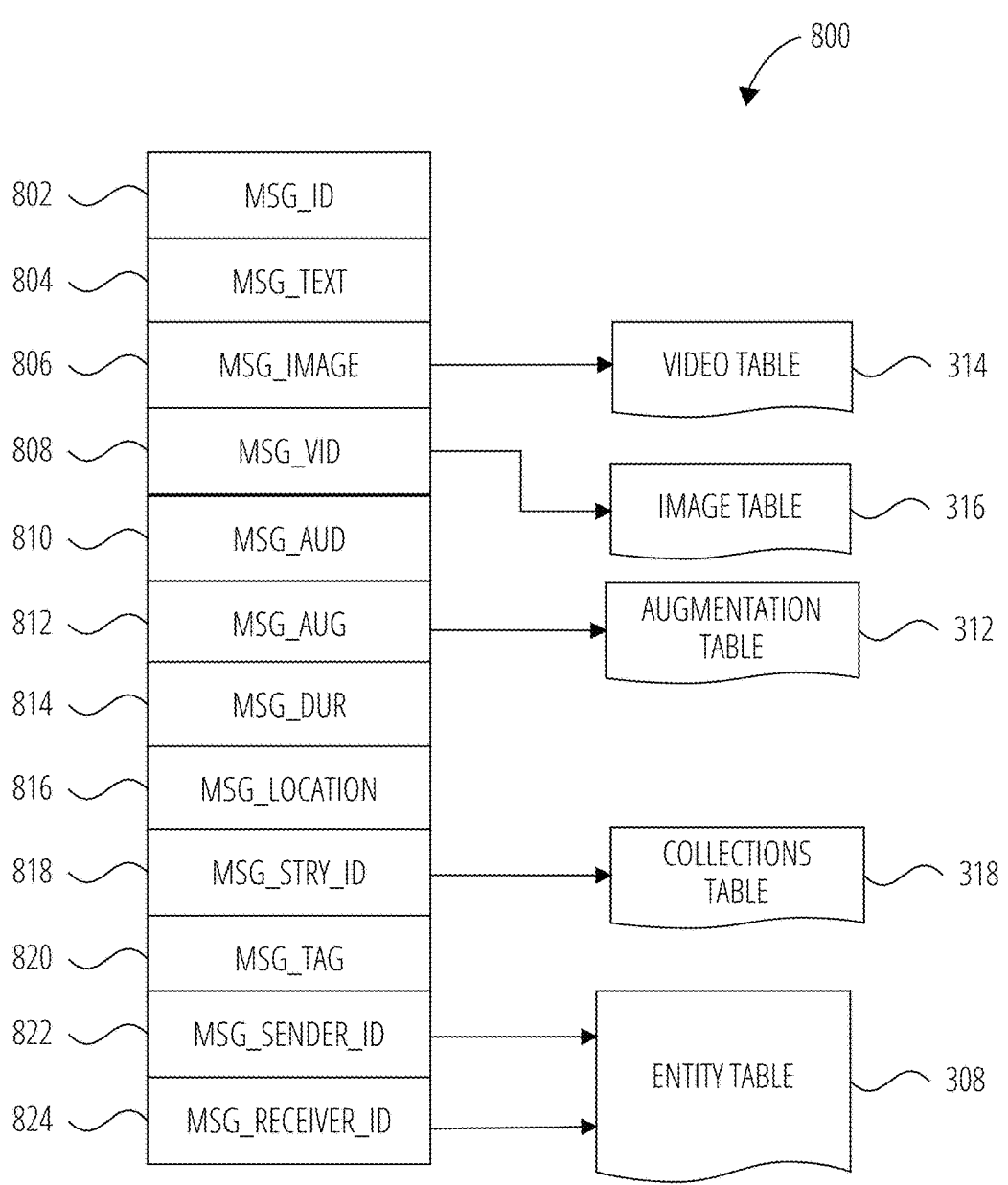
FIG. 8 is a diagrammatic representation of a message, according to some examples.

FIG. 8 is a schematic diagram illustrating a structure of a message 800, according to some examples, generated by an interaction client 104 for communication to a further interaction client 104 via the interaction servers 124. The content of a particular message 800 is used to populate the message table 306 stored within the database 304, accessible by the interaction servers 124. Similarly, the content of a message 800 is stored in memory as "in-transit" or "in-flight" data of the user system 102 or the interaction servers 124. A message 800 is shown to include the following example components:

Message identifier 802: a unique identifier that identifies the message 800.

Message text payload 804: text, to be generated by a user via a user interface of the user system 102, and that is included in the message 800.

Message image payload 806: image data, captured by a camera component of a user system 102 or retrieved from a memory component of a user system 102, and that is included in the message 800. Image data for a sent or received message 800 may be stored in the image table 316.

Message video payload 808: video data, captured by a camera component or retrieved from a memory component of the user system 102, and that is included in the message 800. Video data for a sent or received message 800 may be stored in the image table 316.

Message audio payload 810: audio data, captured by a microphone or retrieved from a memory component of the user system 102, and that is included in the message 800.

Message augmentation data 812: augmentation data (e.g., filters, stickers, or other annotations or enhancements) that represents augmentations to be applied to message image payload 806, message video payload 808, or message audio payload 810 of the message 800. Augmentation data for a sent or received message 800 may be stored in the augmentation table 312.

Message duration parameter 814: parameter value indicating, in seconds, the amount of time for which content of the message (e.g., the message image payload 806, message video payload 808, message audio payload 810) is to be presented or made accessible to a user via the interaction client 104.

Message geolocation parameter 816: geolocation data (e.g., latitudinal and longitudinal coordinates) associated with the content payload of the message. Multiple message geolocation parameter 816 values may be included in the payload, each of these parameter values being associated with respect to content items included in the content (e.g., a specific image within the message image payload 806, or a specific video in the message video payload 808).

Message story identifier 818: identifier values identifying one or more content collections (e.g., "stories" identified in the collections table 318) with which a particular content item in the message image payload 806 of the message 800 is associated. For example, multiple images within the message image payload 806 may each be associated with multiple content collections using identifier values.

Message tag 820: each message 800 may be tagged with multiple tags, each of which is indicative of the subject matter of content included in the message payload. For example, where a particular image included in the message image payload 806 depicts an animal (e.g., a lion), a tag value may be included within the message tag 820 that is indicative of the relevant animal. Tag values may be generated manually, based on user input, or may be automatically generated using, for example, image recognition.

Message sender identifier 822: an identifier (e.g., a messaging system identifier, email address, or device identifier) indicative of a user of the user system 102 on which the message 800 was generated and from which the message 800 was sent.

Message receiver identifier 824: an identifier (e.g., a messaging system identifier, email address, or device identifier) indicative of a user of the user system 102 to which the message 800 is addressed.

The contents (e.g., values) of the various components of message 800 may be pointers to locations in tables within which content data values are stored. For example, an image value in the message image payload 806 may be a pointer to (or address of) a location within an image table 316. Similarly, values within the message video payload 808 may point to data stored within an image or video table 316, values stored within the message augmentation data 812 may point to data stored in an augmentation table 312, values stored within the message story identifier 818 may point to data stored in a collections table 318, and values stored within the message sender identifier 822 and the message receiver identifier 824 may point to user records stored within an entity table 308.

System with Head-Wearable Apparatus

Figure 9:
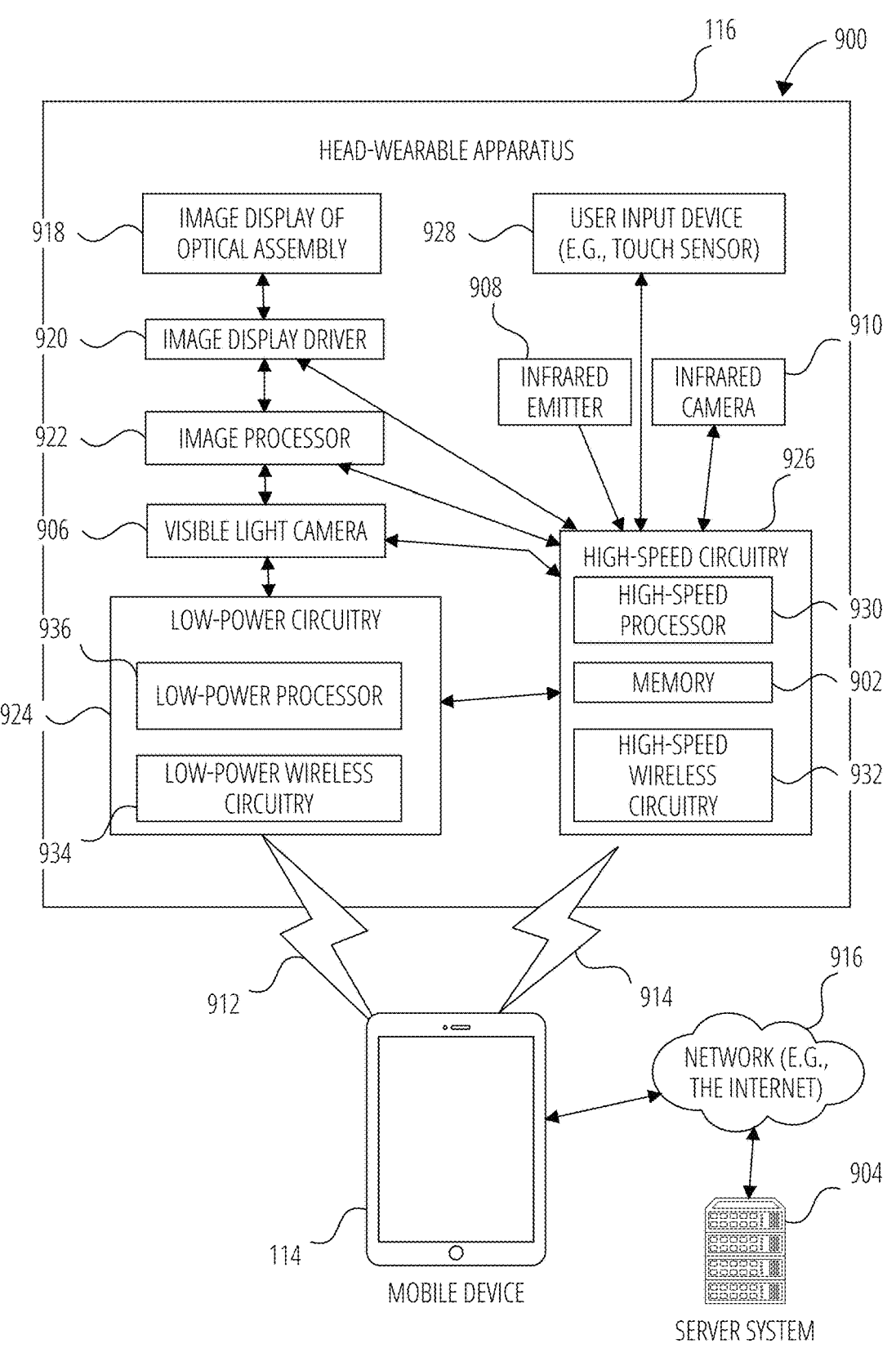
FIG. 9 illustrates a system including a head-wearable apparatus with a selector input device, according to some examples.

FIG. 9 illustrates a system 900 including a head-wearable apparatus 116 with a selector input device, according to some examples. FIG. 9 is a high-level functional block diagram of an example head-wearable apparatus 116 communicatively coupled to a mobile device 114 and various server systems 904 (e.g., the interaction server system 110) via various networks 108. The networks 108 may include any combination of wired and wireless connections.

The head-wearable apparatus 116 includes one or more cameras, each of which may be, for example, a visible light camera 906, an infrared emitter 908, and an infrared camera 910.

An interaction client, such as a mobile device 114 connects with head-wearable apparatus 116 using both a low-power wireless connection 912 and a high-speed wireless connection 914. The mobile device 114 is also connected to the server system 904 and the network 916.

The head-wearable apparatus 116 further includes two image displays of the image display of optical assembly 918. The two image displays of optical assembly 918 include one associated with the left lateral side and one associated with the right lateral side of the head-wearable apparatus 116. The head-wearable apparatus 116 also includes an image display driver 920, an image processor 922, low-power circuitry 924, and high-speed circuitry 926. The image display of optical assembly 918 is for presenting images and videos, including an image that includes a graphical user interface to a user of the head-wearable apparatus 116.

The image display driver 920 commands and controls the image display of optical assembly 918. The image display driver 920 may deliver image data directly to the image display of optical assembly 918 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 928 (e.g., touch sensor or push button), including an input surface on the head-wearable apparatus 116. The user input device 928 (e.g., touch sensor or push button) is to receive from the user an input selection to manipulate the graphical user interface of the presented image.

The components shown in FIG. 9 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 906 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 902, which stores instructions to perform a subset or all of the functions described herein. The memory 902 can also include storage device.

As shown in FIG. 9, the high-speed circuitry 926 includes a high-speed processor 930, a memory 902, and high-speed wireless circuitry 932. In some examples, the image display driver 920 is coupled to the high-speed circuitry 926 and operated by the high-speed processor 930 in order to drive the left and right image displays of the image display of optical assembly 918. The high-speed processor 930 may be any processor capable of managing high-speed communications and operation of any general computing system needed for the head-wearable apparatus 116. The high-speed processor 930 includes processing resources needed for managing high-speed data transfers on a high-speed wireless connection 914 to a wireless local area network (WLAN) using the high-speed wireless circuitry 932. In certain examples, the high-speed processor 930 executes an operating system such as a LINUX operating system or other such operating system of the head-wearable apparatus 116, and the operating system is stored in the memory 902 for execution. In addition to any other responsibilities, the high-speed processor 930 executing a software architecture for the head-wearable apparatus 116 is used to manage data transfers with high-speed wireless circuitry 932. In certain examples, the high-speed wireless circuitry 932 is configured to implement Institute of Electrical and Electronic Engineers (IEEE) 802.11 communication standards, also referred to herein as WI-FI®. In some examples, other high-speed communications standards may be implemented by the high-speed wireless circuitry 932.

The low-power wireless circuitry 934 and the high-speed wireless circuitry 932 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 912 and the high-speed wireless connection 914, may be implemented using details of the architecture of the head-wearable apparatus 116, as can other elements of the network 916.

The memory 902 includes any storage device capable of storing various data and applications, including, among other things, camera data generated by the left and right visible light cameras 906, the infrared camera 910, and the image processor 922, as well as images generated for display by the image display driver 920 on the image displays of the image display of optical assembly 918. While the memory 902 is shown as integrated with high-speed circuitry 926, in some examples, the memory 902 may be an independent standalone element of the head-wearable apparatus 116. In certain such examples, electrical routing lines may provide a connection through a chip that includes the high-speed processor 930 from the image processor 922 or the low-power processor 936 to the memory 902. In some examples, the high-speed processor 930 may manage addressing of the memory 902 such that the low-power processor 936 will boot the high-speed processor 930 any time that a read or write operation involving memory 902 is needed.

As shown in FIG. 9, the low-power processor 936 or high-speed processor 930 of the head-wearable apparatus 116 can be coupled to the camera (visible light camera 906, infrared emitter 908, or infrared camera 910), the image display driver 920, the user input device 928 (e.g., touch sensor or push button), and the memory 902.

The head-wearable apparatus 116 is connected to a host computer. For example, the head-wearable apparatus 116 is paired with the mobile device 114 via the high-speed wireless connection 914 or connected to the server system 904 via the network 916. The server system 904 may be one or more computing devices as part of a service or network computing system, for example, that includes a processor, a memory, and network communication interface to communicate over the network 916 with the mobile device 114 and the head-wearable apparatus 116.

The mobile device 114 includes a processor and a network communication interface coupled to the processor. The network communication interface allows for communication over the network 916, low-power wireless connection 912, or high-speed wireless connection 914. Mobile device 114 can further store at least portions of the instructions in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 920. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 904, such as the user input device 928, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 912 and high-speed wireless connection 914 from the mobile device 114 via the low-power wireless circuitry 934 or high-speed wireless circuitry 932.

Machine Architecture

Figure 10:
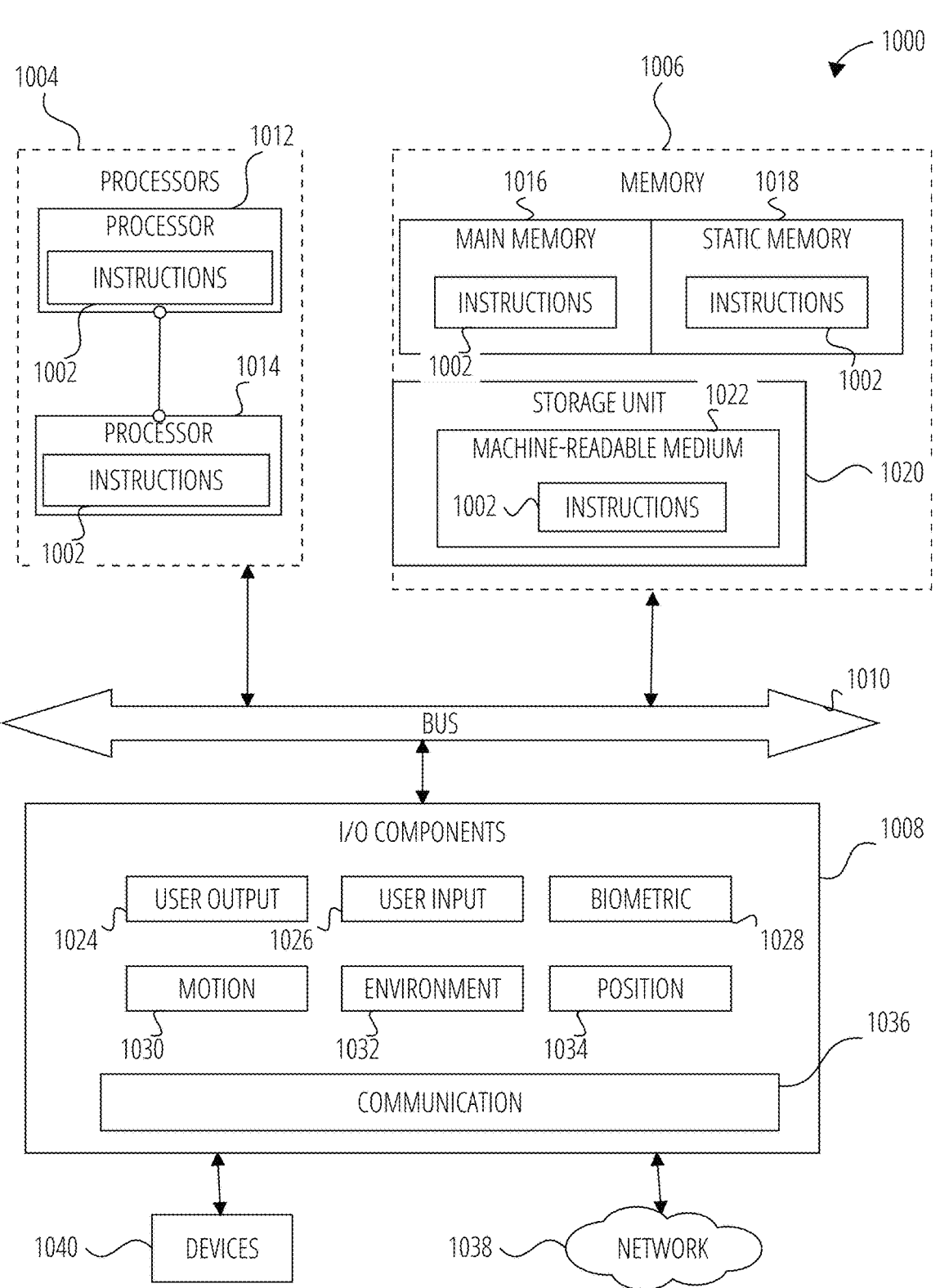
FIG. 10 is a diagrammatic representation of a machine in the form of a computer system within which a set of instructions may be executed to cause the machine to perform any one or more of the methodologies discussed herein, according to some examples.

FIG. 10 is a diagrammatic representation of the machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the interaction server system 110. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions

1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 1030 include acceleration sensor components (e.g., accelerometer), gravitation sensor components, rotation sensor components (e.g., gyroscope).

The environmental components 1032 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gasses for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., hypertext transfer protocol (HTTP)). Similarly, the instructions 1002 may be transmitted or received using a transmission medium via a coupling (e.g., a peer-to-peer coupling) to the devices 1040.

Software Architecture

Figure 11:
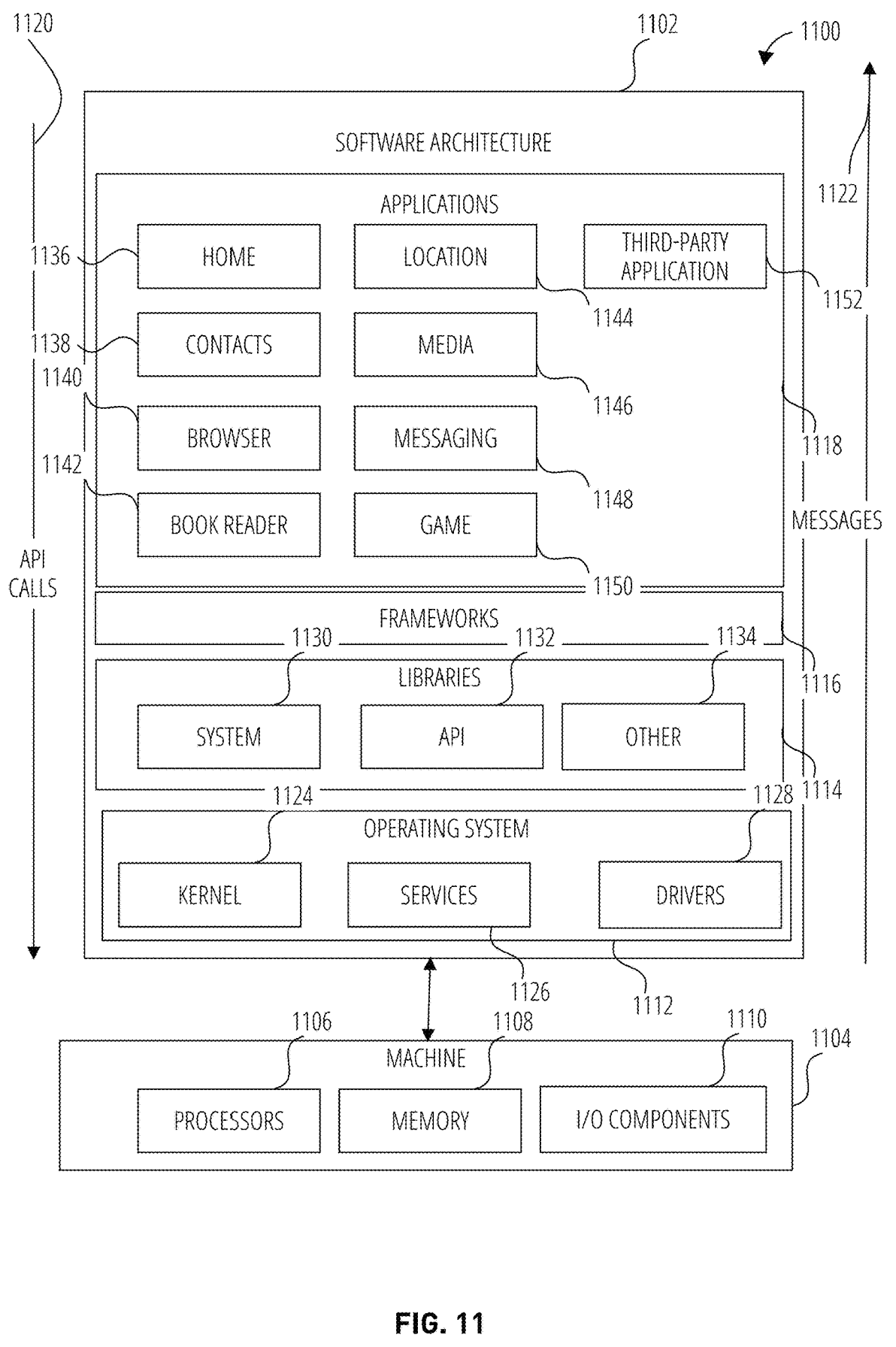

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various graphical user interface (GUI) functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1152 can invoke the API calls 1120 provided by the operating system 1112 to facilitate functionalities described herein.

Machine-Learning Pipeline

Figure 13:
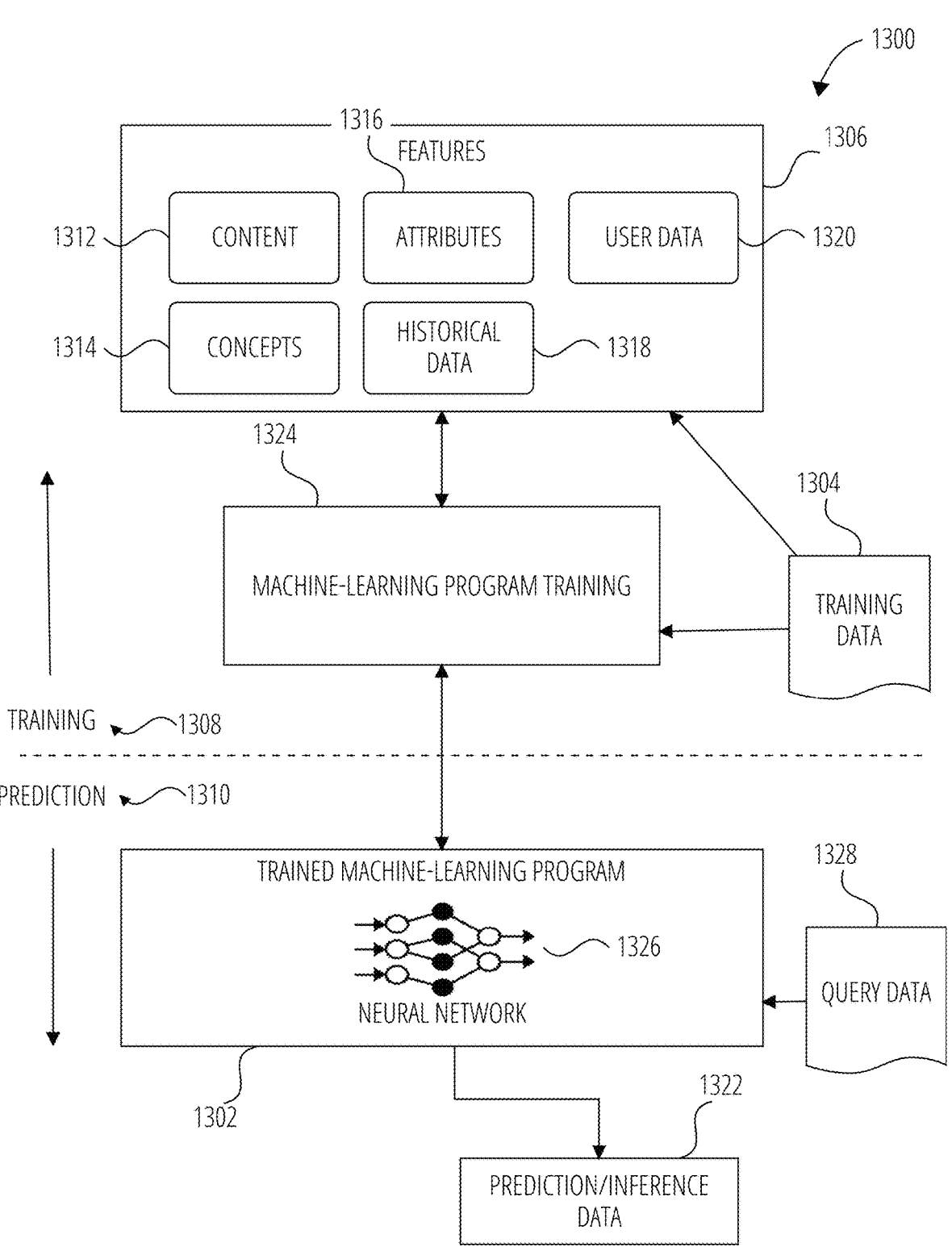
FIG. 13 illustrates training and use of a machine-learning program, according to some examples.

FIG. 13 is a flowchart depicting a machine-learning pipeline 1300, according to some examples. The machine-learning pipelines 1300 may be used to generate a trained model, for example the trained machine-learning program 1302 of FIG. 13, described herein to perform operations associated with searches and query responses.

Overview

Broadly, machine learning may involve using computer algorithms to automatically learn patterns and relationships in data, potentially without the need for explicit programming to do so after the algorithm is trained. Examples of machine learning algorithms can be divided into three main categories: supervised learning, unsupervised learning, and reinforcement learning.

Supervised learning involves training a model using labeled data to predict an output for new, unseen inputs. Examples of supervised learning algorithms include linear regression, decision trees, and neural networks.

Unsupervised learning involves training a model on unlabeled data to find hidden patterns and relationships in the data. Examples of unsupervised learning algorithms include clustering, principal component analysis, and generative models like autoencoders.

Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data. Evaluating the model on a separate test set helps to mitigate the risk of overfitting, a common issue in machine learning where a model learns to perform exceptionally well on the training data but fails to maintain that performance on data it hasn't encountered before. By using a test set, the system obtains a more reliable estimate of the model's real-world performance and its potential effectiveness when deployed in practical applications.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Phases

Generating a trained machine-learning program 1302 may include multiple types of phases that form part of the machine-learning pipeline 1300, including for example the following phases 1200 illustrated in FIG. 12:

Data collection and preprocessing 1202: This may include acquiring and cleaning data to ensure that it is suitable for use in the machine learning model. Data can be gathered from user content creation and labeled using a machine learning algorithm trained to label data. Data can be generated by applying a machine learning algorithm to identify or generate similar data. This may also include removing duplicates, handling missing values, and converting data into a suitable format.

Feature engineering 1204: This may include selecting and transforming the training data 1304 to create features that are useful for predicting the target variable. Feature engineering may include (1) receiving features 1306 (e.g., as structured or labeled data in supervised learning) and/or (2) identifying features 1306 (e.g., unstructured or unlabeled data for unsupervised learning) in training data 1304.

Model selection and training 1206: This may include specifying a particular problem or desired response from input data, selecting an appropriate machine learning algorithm, and training it on the preprocessed data. This may further involve splitting the data into training and testing sets, using cross-validation to evaluate the model, and tuning hyperparameters to improve performance. Model selection can be based on factors such as the type of data, problem complexity, computational resources, or desired performance.

Model evaluation 1208: This may include evaluating the performance of a trained model (e.g., the trained machine-learning program 1302) on a separate testing dataset. This can help determine if the model is over-fitting or underfitting and if it is suitable for deployment.

Prediction 1210: This involves using a trained model (e.g., trained machine-learning program 1302) to generate predictions on new, unseen data.

Validation, refinement or retraining block 1212: This may include updating a model based on feedback generated from the prediction phase, such as new data or user feedback.

Deployment 1214: This may include integrating the trained model (e.g., the trained machine-learning program 1302) into a larger system or application, such as a web service, mobile app, or IoT device. This can involve setting up APIs, building a user interface, and ensuring that the model is scalable and can handle large volumes of data.

FIG. 13 illustrates two example phases, namely a training phase 1308 (part of the model selection and trainings 1206) and a prediction phase 1310 (part of prediction 1210). Prior to the training phase 1308, feature engineering 1204 is used to identify features 1306. This may include identifying informative, discriminating, and independent features for the effective operation of the trained machine-learning program 1302 in pattern recognition, classification, and regression. In some examples, the training data 1304 includes labeled data, which is known data for pre-identified features 1306 and one or more outcomes.

Each of the features 1306 may be a variable or attribute, such as individual measurable property of a process, article, system, or phenomenon represented by a data set (e.g., the training data 1304). Features 1306 may also be of different types, such as numeric features, strings, vectors, matrices, encodings, and graphs, and may include one or more of content 1312, concepts 1314, attributes 1316, historical data 1318 and/or user data 1320, merely for example. Concept features can include abstract relationships or patterns in data, such as determining a topic of a document or discussion in a chat window between users. Content features include determining a context based on input information, such as determining a context of a user based on user interactions or surrounding environmental factors. Context features can include text features, such as frequency or preference of words or phrases, image features, such as pixels, textures, or pattern recognition, audio classification, such as spectrograms, and/or the like. Attribute features include intrinsic attributes (directly observable) or extrinsic features (derived), such as identifying square footage, location, or age of a real estate property identified in a camera feed. User data features include data pertaining to a particular individual or to a group of individuals, such as in a geographical location or that share demographic characteristics. User data can include demographic data (such as age, gender, location, or occupation), user behavior (such as browsing history, purchase history, conversion rates, click-through rates, or engagement metrics), or user preferences (such as preferences to certain video, text, or digital content items). Historical data includes past events or trends that can help identify patterns or relationships over time.

In training phases 1308, the machine-learning pipeline 1300 uses the training data 1304 to find correlations among the features 1306 that affect a predicted outcome or prediction/inference data 1322.

With the training data 1304 and the identified features 1306, the trained machine-learning program 1302 is trained during the training phase 1308 during machine-learning program training 1324. The machine-learning program training 1324 appraises values of the features 1306 as they correlate to the training data 1304. The result of the training is the trained machine-learning program 1302 (e.g., a trained or learned model).

Further, the training phase 1308 may involve machine learning, in which the training data 1304 is structured (e.g., labeled during preprocessing operations), and the trained machine-learning program 1302 implements a relatively simple neural network 1326 capable of performing, for example, classification and clustering operations. In other examples, the training phase 1308 may involve deep learning, in which the training data 1304 is unstructured, and the trained machine-learning program 1302 implements a deep neural network 1326 that is able to perform both feature extraction and classification/clustering operations.

A neural network 1326 may, in some examples, be generated during the training phase 1308, and implemented within the trained machine-learning program 1302. The neural network 1326 includes a hierarchical (e.g., layered) organization of neurons, with each layer including multiple neurons or nodes. Neurons in the input layer receive the input data, while neurons in the output layer produce the final output of the network. Between the input and output layers, there may be one or more hidden layers, each including multiple neurons.

Each neuron in the neural network 1326 operationally computes a small function, such as an activation function that takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, which can affect their performance on different tasks. Overall, the layered organization of neurons and the use of activation functions and weights enable neural networks to model complex relationships between inputs and outputs, and to generalize to new inputs that were not seen during training.

In some examples, the neural network 1326 may also be one of a number of different types of neural networks or a combination thereof, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self- Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1308, a validation phase may be performed and/or evaluated on a separate dataset known as the validation dataset. The validation dataset is used to tune the hyperparameters of a model, such as the learning rate and the regularization parameter. The hyperparameters are adjusted to improve the performance of the model on the validation dataset.

The neural network 1326 is iteratively trained by adjusting model parameters to minimize a specific loss function or maximize a certain objective. The system can continue to train the neural network 1326 by adjusting parameters based on the output of the validation, refinement, or retraining block 1212, and rerun the prediction 1210 on new or already run training data. The system can employ optimization techniques for these adjustments such as gradient descent algorithms, momentum algorithms, Nesterov Accelerated Gradient (NAG) algorithm, and/or the like. The system can continue to iteratively train the neural network 1326 even after deployment 1214 of the neural network 1326. The neural network 1326 can be continuously trained as new data emerges, such as based on user creation or system-generated training data.

Once a model is fully trained and validated, in a testing phase, the model may be tested on a new dataset that the model has not seen before. The testing dataset is used to evaluate the performance of the model and to ensure that the model has not overfit the training data.

In prediction phase 1310, the trained machine-learning program 1302 uses the features 1306 for analyzing query data 1328 to generate inferences, outcomes, or predictions, as examples of a prediction/inference data 1322. For example, during prediction phase 1310, the trained machine-learning program 1302 is used to generate an output. Query data 1328 is provided as an input to the trained machine-learning program 1302, and the trained machine-learning program 1302 generates the prediction/inference data 1322 as output, responsive to receipt of the query data 1328. Query data can include a prompt, such as a user entering a textual question or speaking a question audibly. In some cases, the system generates the query based on an interaction function occurring in the system, such as a user interacting with a virtual object, a user sending another user a question in a chat window, or an object detected in a camera feed.

In some examples the trained machine-learning program 1302 may be a generative AI model. Generative AI is a term that may refer to any type of artificial intelligence that can create new content from training data 1304. For example, generative AI can produce text, images, video, audio, code or synthetic data that are similar to the original data but not identical.

Some of the techniques that may be used in generative AI are:

Convolutional Neural Networks (CNNs): CNNs are commonly used for image recognition and computer vision tasks. They are designed to extract features from images by using filters or kernels that scan the input image and highlight important patterns. CNNs may be used in applications such as object detection, facial recognition, and autonomous driving.

Recurrent Neural Networks (RNNs): RNNs are designed for processing sequential data, such as speech, text, and time series data. They have feedback loops that allow them to capture temporal dependencies and remember past inputs. RNNs may be used in applications such as speech recognition, machine translation, and sentiment analysis Generative adversarial networks (GANs): These are models that consist of two neural networks: a generator and a discriminator. The generator tries to create realistic content that can fool the discriminator, while the discriminator tries to distinguish between real and fake content. The two networks compete with each other and improve over time. GANs may be used in applications such as image synthesis, video prediction, and style transfer.

Variational autoencoders (VAEs): These are models that encode input data into a latent space (a compressed representation) and then decode it back into output data. The latent space can be manipulated to generate new variations of the output data. They may use self-attention mechanisms to process input data, allowing them to handle long sequences of text and capture complex dependencies.

Transformer models: These are models that use attention mechanisms to learn the relationships between different parts of input data (such as words or pixels) and generate output data based on these relationships. Transformer models can handle sequential data such as text or speech as well as non-sequential data such as images or code.

In generative AI examples, the prediction/inference data 1322 that is output include trend assessment and predictions, translations, summaries, image or video recognition and categorization, natural language processing, face recognition, user sentiment assessments, advertisement targeting and optimization, voice recognition, or media content generation, recommendation, and personalization.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; and at least one memory component storing instructions that, when executed by the at least one processor, cause the at least one processor to perform operations comprising: accessing a media content item of a user that includes, a face of the user; analyzing data associated with the media content item using a first machine learning model to generate a first modified media content item; parsing a portion of the first modified media content item corresponding to the face of the user; and analyzing data associated with the portion of the first modified media content item using a second machine learning model to generate a digital avatar for the user.

In Example 2, the subject matter of Example 1 includes, wherein the operations further comprise identifying a prompt of the user indicating an intent for the media content item, wherein analyzing data using the first or second machine learning model further comprises processing data associated with the identified prompt.

In Example 3, the subject matter of Example 2 includes, wherein identifying the prompt for the user comprises receiving a question or request from the user via text or speech.

In Example 4, the subject matter of Examples 2-3 includes, wherein identifying the prompt for the user comprises automatically generating the prompt based on an intent identified from real-time interaction data captured by an interaction client of the user.

In Example 5, the subject matter of Examples 2-4 includes, wherein the operations further comprise identifying keywords from the prompt and applying weights to each of the identified keywords, wherein analyzing the data comprises applying the identified keywords and corresponding weights to the first or second machine learning model.

In Example 6, the subject matter of Examples 1-5 includes, wherein the first machine learning model is trained to maintain one or more first facial features or reduce an amount of modification to the one or more first facial features, while modifying one or more second facial features.

In Example 7, the subject matter of Example 6 includes, wherein the second machine learning model is trained to modify the one or more first facial features.

In Example 8, the subject matter of Examples 1-7 includes, wherein the digital avatar includes a modified face of the user in a same pose as the face of the user in the media content item.

In Example 9, the subject matter of Examples 1-8 includes, wherein the operations further comprise removing one or more artifacts of the digital avatar based on a comparison between the face in the media content item and the face in the digital avatar.

In Example 10, the subject matter of Example 9 includes, wherein removing the one or more artifacts comprises analyzing the media content item and the digital avatar using a third machine learning model to receive a third modified media content item, wherein the third machine learning model is trained to compare media content items and modified media content items to remove artifacts in the modified media content items.

In Example 11, the subject matter of Examples 1-10 includes, wherein parsing the portion of the first modified media content item corresponding to the face of the user includes parsing hair from the face, wherein the digital avatar includes hair for a face in the digital avatar generated by the second machine learning model.

In Example 12, the subject matter of Examples 1-11 includes, wherein the operations further comprise: causing display of a first selectable user interface element associated with the digital avatar; and in response to a user selection of the first selectable user interface element: applying a first content augmentation of the digital avatar to a camera feed from a camera system; and displaying the camera feed with the applied first content augmentation on a user interface for the user.

In Example 13, the subject matter of Example 12 includes, wherein the operations further comprise: displaying a second selectable user interface element; and in response to a user selection of the second selectable user interface element: capturing a picture or video of the camera feed with the applied first content augmentation; displaying a third selectable user interface element; and in response to a user selection of the third selectable user interface element, transmitting the captured picture or video to a second user.

In Example 14, the subject matter of Examples 1-13 includes, wherein parsing the portion of the first modified media content item corresponding to the face of the user comprises extracting facial features from the first modified media content item.

In Example 15, the subject matter of Examples 1-14 includes, wherein the first machine learning model is trained using unsupervised learning to generate first modified media content items based on original media content items, wherein the first machine learning model is trained to map facial landmarks on input media content items to landmarks of certain modifications to generate the modified media content items.

In Example 16, the subject matter of Example 15 includes, wherein the second machine learning model is trained using supervised learning to generate digital avatars based on portions of the first modified media content items, wherein the second machine learning model is trained to apply noise to input media content items and then to remove the noise inputted into the media content items to generate modified media content items.

In Example 17, the subject matter of Examples 1-16 includes, wherein the first machine learning model is trained to apply a discriminator network that takes as input media content items and modified media content items and outputs a determination whether the modified media content item is a real or fake image.

In Example 18, the subject matter of Examples 1-17 includes, wherein the operations further comprise: training the second machine learning model by: identifying modified media content items and expected media content items; applying the modified media content items to receive output media content items; comparing the output media content items with the expected media content items to determine a loss function for the second machine learning model; and updating one or more parameters of the second machine learning model based on the loss function.

Example 19 is a method comprising: accessing a media content item of a user that includes, a face of the user; analyzing data associated with the media content item using a first machine learning model to generate a first modified media content item; parsing a portion of the first modified media content item corresponding to the face of the user; and analyzing data associated with the portion of the first modified media content item using a second machine learning model to generate a digital avatar for the user.

Example 20 is a non-transitory computer-readable storage medium storing instructions that, when executed by at least one processor, cause the at least one processor to perform operations comprising: accessing a media content item of a user that includes, a face of the user; analyzing data associated with the media content item using a first machine learning model to generate a first modified media content item; parsing a portion of the first modified media content item corresponding to the face of the user; and analyzing data associated with the portion of the first modified media content item using a second machine learning model to generate a digital avatar for the user.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Glossary

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media.

"Non-transitory computer-readable storage medium" refers, for example, to a tangible medium that is capable of storing, encoding, or carrying the instructions for execution by a machine.

"User device" refers, for example, to a device accessed, controlled or owned by a user and with which the user interacts with to perform an action or interaction on the user device, including an interaction with other users or computer systems.

CONCLUSION

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and sub-combinations are intended to fall within the scope of this disclosure. In addition, certain method or process blocks may be omitted in some implementations.

What is claimed is:

1. A system comprising:
at least one processor; and
at least one memory component storing instructions that, when executed by the at least one processor, cause the at least one processor to perform operations comprising:
accessing a media content item of a user that includes a face of the user;
analyzing data associated with the media content item using a first machine learning model to generate a first modified media content item;
parsing a portion of the first modified media content item corresponding to the face of the user;
analyzing data associated with the portion of the first modified media content item using a second machine learning model to generate a digital avatar for the user; and
removing one or more artifacts of the digital avatar by analyzing the media content item and the digital avatar using a third machine learning model to receive a third modified media content item, wherein the third machine learning model is trained to compare media content items and modified media content items to remove artifacts in the modified media content items.

2. The system of claim 1, wherein the operations further comprise identifying a prompt of the user indicating an intent for the media content item, wherein analyzing data using the first or second machine learning model further comprises processing data associated with the identified prompt.

3. The system of claim 2, wherein identifying the prompt for the user comprises receiving a question or request from the user via text or speech.

4. The system of claim 2, wherein identifying the prompt for the user comprises automatically generating the prompt based on an intent identified from real-time interaction data captured by an interaction client of the user.

5. The system of claim 2, wherein the operations further comprise identifying keywords from the prompt and applying weights to each of the identified keywords, wherein analyzing the data comprises applying the identified keywords and corresponding weights to the first or second machine learning model.

6. The system of claim 1, wherein the first machine learning model is trained to maintain one or more first facial features or reduce an amount of modification to the one or more first facial features, while modifying one or more second facial features.

7. The system of claim 6, wherein the second machine learning model is trained to modify the one or more first facial features.

8. The system of claim 1, wherein the digital avatar includes a modified face of the user in a same pose as the face of the user in the media content item.

9. The system of claim 1, wherein removing the one or more artifacts of the digital avatar is based on a comparison between the face in the media content item and the face in the digital avatar.

10. The system of claim 1, wherein parsing the portion of the first modified media content item corresponding to the face of the user includes parsing hair from the face, wherein the digital avatar includes hair for a face in the digital avatar generated by the second machine learning model.

11. The system of claim 1, wherein the operations further comprise:

causing display of a first selectable user interface element associated with the digital avatar; and in response to a user selection of the first selectable user interface element:

applying a first content augmentation of the digital avatar to a camera feed from a camera system; and displaying the camera feed with the applied first content augmentation on a user interface for the user.

12. The system of claim 11, wherein the operations further comprise:

displaying a second selectable user interface element; and in response to a user selection of the second selectable user interface element:

capturing a picture or video of the camera feed with the applied first content augmentation;

displaying a third selectable user interface element; and in response to a user selection of the third selectable user interface element, transmitting the captured picture or video to a second user.

13. The system of claim 1, wherein parsing the portion of the first modified media content item corresponding to the face of the user comprises extracting facial features from the first modified media content item.

14. The system of claim 1, wherein the first machine learning model is trained using unsupervised learning to generate first modified media content items based on original media content items, wherein the first machine learning model is trained to map facial landmarks on input media content items to landmarks of certain modifications to generate the modified media content items.

15. The system of claim 14, wherein the second machine learning model is trained using supervised learning to generate digital avatars based on portions of the first modified media content items.

16. The system of claim 1, wherein the first machine learning model is trained to apply a discriminator network that takes as input media content items and modified media content items and outputs a determination whether the modified media content item is a real or fake image.

17. A method comprising:

accessing a media content item of a user that includes a face of the user;

analyzing data associated with the media content item using a first machine learning model to generate a first modified media content item, wherein the first machine learning model is trained using unsupervised learning to generate first modified media content items based on original media content items, wherein the first machine learning model is trained to map facial landmarks on input media content items to landmarks of certain modifications to generate the modified media content items;

parsing a portion of the first modified media content item corresponding to the face of the user; and analyzing data associated with the portion of the first modified media content item using a second machine learning model to generate a digital avatar for the user, wherein the second machine learning model is trained to apply noise to input media content items and then to remove the noise inputted into the media content items to generate modified media content items, wherein the second machine learning model is trained using supervised learning to generate digital avatars based on portions of the first modified media content items.

18. The method of claim 17, further comprising removing the one or more artifacts of the digital avatar is based on a comparison between the face in the media content item and the face in the digital avatar.

19. A non-transitory computer-readable storage medium storing instructions that, when executed by at least one processor, cause the at least one processor to perform operations comprising:

accessing a media content item of a user that includes a face of the user;

analyzing data associated with the media content item using a first machine learning model to generate a first modified media content item;

parsing a portion of the first modified media content item corresponding to the face of the user;

analyzing data associated with the portion of the first modified media content item using a second machine learning model to generate a digital avatar for the user; and training the second machine learning model by:

identifying modified media content items and expected media content items;

applying the modified media content items to receive output media content items;

comparing the output media content items with the expected media content items to determine a loss function for the second machine learning model; and updating one or more parameters of the second machine learning model based on the loss function.

\* \* \* \* \*